United States Patent
Ait-Haddou et al.

(10) Patent No.: US 9,260,569 B2
(45) Date of Patent: *Feb. 16, 2016

(54) HYDROPHILIC BLOCK COPOLYMERS AND METHOD OF PREPARATION THEREOF (III)

(71) Applicant: PALL CORPORATION, Port Washington, NY (US)

(72) Inventors: Hassan Ait-Haddou, Melville, NY (US); Frank Onyemauwa, Pace, FL (US)

(73) Assignee: Pall Corporation, Port Washington, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/320,400

(22) Filed: Jun. 30, 2014

(65) Prior Publication Data

US 2015/0376342 A1      Dec. 31, 2015

(51) Int. Cl.
*C08G 75/23* (2006.01)

(52) U.S. Cl.
CPC ..................... *C08G 75/23* (2013.01)

(58) Field of Classification Search
CPC ............... C08G 65/22; C08G 65/2612
See application file for complete search history.

(56) References Cited

U.S. PATENT DOCUMENTS

| | | |
|---|---|---|
| 3,318,959 A | 5/1967 | Borman |
| 3,498,959 A * | 3/1970 | Brode ..................... C08G 75/12 528/289 |
| 3,625,977 A | 12/1971 | Hamb |
| 3,847,867 A | 11/1974 | Heath et al. |
| 4,242,384 A | 12/1980 | Andrew et al. |
| 4,435,330 A * | 3/1984 | Falk ........................ C11D 1/004 544/158 |
| 4,485,211 A | 11/1984 | Okamoto |
| 4,611,048 A | 9/1986 | Peters |
| 4,698,388 A | 10/1987 | Ohmura et al. |
| 4,725,441 A | 2/1988 | Porter et al. |
| 4,948,508 A | 8/1990 | Nakagawa et al. |
| 4,954,256 A | 9/1990 | Degen et al. |

(Continued)

FOREIGN PATENT DOCUMENTS

| | | |
|---|---|---|
| DE | 3936997 A1 | 5/1991 |
| EP | 0 298 408 A1 | 1/1989 |

(Continued)

OTHER PUBLICATIONS

Kuhlmann et al. Macromol. Rapid Commun. 2012, 33, 1482-1486.*

(Continued)

*Primary Examiner* — Mike M Dollinger
(74) *Attorney, Agent, or Firm* — Leydig, Voit & Mayer, Ltd.

(57) ABSTRACT

Disclosed are block copolymers suitable for preparing hydrophilic porous membranes, wherein the block copolymers are of the formula: A-B-A (I) and A-B (II), wherein block A is (i) a copolymer of glycidol and allyl glycidyl ether, the copolymer having one or more allyl groups; or (ii) a copolymer of glycidol and allyl glycidyl ether, wherein one or more of the allyl groups of the copolymer have been replaced with 1,2-dihydroxypropyl group or a group of the formula: $-(CH_2)_a-S-(CH_2)_b-X$, wherein a, b, and X are as defined herein, and block B is an aromatic hydrophobic polymeric segment, for example, polyethersulfone. Also disclosed is a method of preparing such block copolymers.

16 Claims, 1 Drawing Sheet

(56) References Cited

U.S. PATENT DOCUMENTS

| | | | |
|---|---|---|---|
| 5,082,565 A | 1/1992 | Haubs et al. | |
| 5,191,026 A | 3/1993 | Nishi et al. | |
| 5,198,554 A | 3/1993 | Inagaki et al. | |
| 5,202,388 A | 4/1993 | Iio et al. | |
| 5,282,965 A | 2/1994 | Urairi et al. | |
| 5,286,382 A | 2/1994 | Scarmoutzos et al. | |
| 5,462,867 A | 10/1995 | Azad et al. | |
| 5,580,934 A | 12/1996 | Nishi et al. | |
| 5,599,882 A | 2/1997 | Nishi et al. | |
| 5,726,230 A * | 3/1998 | Murata | C08K 5/103 523/403 |
| 5,824,049 A | 10/1998 | Ragheb et al. | |
| 5,911,880 A | 6/1999 | Klein et al. | |
| 5,969,170 A | 10/1999 | Grubbs et al. | |
| 5,976,380 A | 11/1999 | Moya | |
| 5,998,326 A | 12/1999 | Hafner et al. | |
| 6,039,872 A | 3/2000 | Wu et al. | |
| 6,096,020 A | 8/2000 | Hofmann | |
| 6,111,121 A | 8/2000 | Grubbs et al. | |
| 6,126,825 A | 10/2000 | Shinagawa et al. | |
| 6,354,443 B1 | 3/2002 | Moya | |
| 6,420,503 B1 | 7/2002 | Jayaraman et al. | |
| 6,669,980 B2 | 12/2003 | Hansen | |
| 6,734,386 B1 | 5/2004 | Lauterbach et al. | |
| 6,759,537 B2 | 7/2004 | Grubbs et al. | |
| 6,846,890 B2 | 1/2005 | Miyaki et al. | |
| 6,867,303 B2 | 3/2005 | Grela | |
| 6,921,735 B2 | 7/2005 | Hoveyda et al. | |
| 7,037,993 B2 | 5/2006 | Taguchi et al. | |
| 7,230,066 B2 | 6/2007 | Khouri et al. | |
| 7,284,668 B2 | 10/2007 | Charkoudian | |
| 7,300,022 B2 | 11/2007 | Muller | |
| 7,329,758 B1 | 2/2008 | Grubbs et al. | |
| 7,378,528 B2 | 5/2008 | Herrmann et al. | |
| 7,611,629 B2 | 11/2009 | Doucoure et al. | |
| 7,628,917 B2 | 12/2009 | Penezina et al. | |
| 7,717,273 B2 | 5/2010 | Kozlov et al. | |
| 7,750,103 B2 | 7/2010 | Emrick et al. | |
| 8,048,963 B2 | 11/2011 | Fuller et al. | |
| 8,049,025 B2 | 11/2011 | Zhan | |
| 8,053,531 B2 | 11/2011 | Hirata et al. | |
| 8,232,360 B2 | 7/2012 | Sampson et al. | |
| 8,277,914 B2 | 10/2012 | Ogawa et al. | |
| 8,283,410 B2 | 10/2012 | Musa | |
| 8,329,927 B2 | 12/2012 | Tew et al. | |
| 8,420,704 B2 | 4/2013 | Hillmyer et al. | |
| 8,440,765 B2 | 5/2013 | Balsara et al. | |
| 8,445,179 B2 * | 5/2013 | Maessen | B41N 3/06 101/453 |
| 8,535,590 B2 | 9/2013 | Milner et al. | |
| 8,647,730 B2 | 2/2014 | Kudo et al. | |
| 2001/0021764 A1 | 9/2001 | Weisse et al. | |
| 2005/0176893 A1 | 8/2005 | Rana et al. | |
| 2005/0222279 A1 * | 10/2005 | Larsson | B01D 15/361 521/50 |
| 2007/0075013 A1 | 4/2007 | Duong et al. | |
| 2007/0238853 A1 | 10/2007 | Hay et al. | |
| 2008/0000201 A1 | 1/2008 | Schorzman et al. | |
| 2009/0127186 A1 | 5/2009 | Mizomoto et al. | |
| 2009/0173694 A1 | 7/2009 | Peinemann et al. | |
| 2009/0200239 A1 * | 8/2009 | Axen | B01D 15/3828 210/656 |
| 2010/0137180 A1 * | 6/2010 | Maessen | B41N 3/06 510/171 |
| 2010/0230351 A1 | 9/2010 | Hoving et al. | |
| 2011/0120937 A1 | 5/2011 | Ishizuka et al. | |
| 2011/0201756 A1 | 8/2011 | Jo et al. | |
| 2011/0206880 A1 * | 8/2011 | Wang | C08G 65/4037 428/36.9 |
| 2012/0077893 A1 | 3/2012 | Hood | |
| 2012/0172537 A1 * | 7/2012 | Arai | C08G 18/4866 525/415 |
| 2013/0041055 A1 | 2/2013 | Hillmyer et al. | |
| 2013/0108845 A1 | 5/2013 | Tee | |
| 2013/0165661 A1 | 6/2013 | Grubbs et al. | |
| 2013/0280237 A1 | 10/2013 | Tew et al. | |
| 2014/0005278 A1 * | 1/2014 | Harth | A61K 47/34 514/772.7 |
| 2015/0247006 A1 | 9/2015 | Klein et al. | |

FOREIGN PATENT DOCUMENTS

| | | |
|---|---|---|
| EP | 0 409 291 A2 | 1/1991 |
| EP | 0 430 585 A2 | 6/1991 |
| EP | 0 713 893 A1 | 5/1996 |
| EP | 0 784 066 A1 | 7/1997 |
| EP | 0 811 420 A1 | 12/1997 |
| EP | 1 238 996 A1 | 9/2002 |
| EP | 1 408 064 A1 | 4/2004 |
| EP | 1769841 A1 | 4/2007 |
| EP | 1 903 074 A1 | 3/2008 |
| EP | 2687285 A1 | 1/2014 |
| JP | S61-204008 A | 9/1986 |
| JP | 2011-122124 A | 6/2011 |
| KR | 2014-0060440 A | 5/2014 |
| WO | WO 01/61042 A2 | 8/2001 |
| WO | WO 02/072659 A1 | 9/2002 |
| WO | WO 2007/018426 A1 | 2/2007 |
| WO | WO 2009/001724 A1 | 12/2008 |
| WO | WO 2009/013340 A1 | 1/2009 |
| WO | WO 2013/097570 A1 | 7/2013 |

OTHER PUBLICATIONS

Adams, Marisa et al., "Investigation of microphase separated dicarboximide-functionalized oxanorbornyl diblock copolymers exhibiting nanostructure," Abstracts of Papers, 247th ACS National Meeting & Exposition, Dallas, TX, United States, Mar. 16-20, 2014.

Asif, A. et al., "Hydroxyl terminated poly(ether ether ketone) with pendant methyl group-toughened epoxy clay ternary nanocomposites: Preparation, morphology, and thermomechanical properties," *Journal of Applied Polymer Science*, vol. 106, No. 5, pp. 2936-2946 (Dec. 5, 2007) Abstract.

Bang, Joona et al., "Defect-Free Nanoporous Thin Films from ABC Triblock Copolymers," *Journal of the American Chemical Society*, vol. 128, pp. 7622-7629 (2006).

"Spin Coat Theory," Brewer Science, Inc., http://www.brewerscience.com/research/processing-theory/spin-coating-theory, downloaded Jun. 30, 2014 (no original publication or copyright date available).

Francis, Bejoy et al., "Synthesis of hydroxyl-terminated poly(ether ether ketone) with pendent *tert*-butyl groups and its use as a toughener for epoxy resins," *Journal of Polymer Science Part B: Polymer Physics*, vol. 44, No. 3, pp. 541-556 (Feb. 1, 2006) (Abstract).

Girotto, Claudio et al., "Spray coating for fabricating polymer-based organic solar cells," *Global Solar Technology*, pp. 10-13 (Mar. 2010).

Guillen, Gregory R. et al., "Preparation and Characterization of Membranes Formed by Nonsolvent Induced Phase Separation: A Review," *Industrial & Engineering Chemistry Research*, vol. 50, pp. 3798-3817 (2011).

Hahn et al., "Structure Formation of Integral-Asymmetric Membrane of Polystyrene-block-Poly(ethylene oxide)," *J. Polym. Sci. B Polym. Phys.*, 51: 281-290 (2013).

Hall, David B. et al., "Spin Coating of Thin and Ultrathin Polymer Films," *Polymer Engineering and Science*, vol. 38, No. 12, pp. 2039-2045 (Dec. 1998).

Hollister, Adrienne et al., "Synthesis and physical properties of dicarboximide-functionalized oxanorbornyl polymers," Abstracts of Papers, 241st ACS National Meeting & Exposition, Anaheim, CA, United States, Mar. 27-31, 2011.

Hollister, Adrienne et al., "Towards novel thin-film polymer blends: Synthesis and characterization of norbornene related homopolymers and diblock copolymers via ring opening metathesis polymerization," Abstracts of Papers, 239th ACS National Meeting, San Francisco, CA, United States, Mar. 21-25, 2010.

Ledoux, Nele, "Ruthenium Olefin Metathesis Catalysts: Tuning of the Ligand Environment," *Universiteit Gent*, pp. 1-198 (2007).

(56) References Cited

OTHER PUBLICATIONS

Li, Li, "Nanoporous Polymers for Membrane Applications," Ph.D. Thesis, DTU Chemical Engineering, pp. 1-180 (Jan. 2012).

Love, Jennifer A. et al., "A Practical and Highly Active Ruthenium-Based Catalyst that Effects the Cross Metathesis of Acrylonitrile," *Angewandte Chemie*, vol. 41, No. 21, pp. 4035-4037 (2002).

Lu, Hua et al., "One-Pot Synthesis of Brush-Like Polymers via Integrated Ring-Opening Metathesis Polymerization and Polymerization of Amino Acid N-Carboxyanhydrides," *Journal of the American Chemical Society*, vol. 131, pp. 13582-13583 (2009).

Mulder, M., "Phase Inversion Membranes," *Membrane Preparation: Phase Inversion Membranes*, pp. 3331-3346 (2000).

Oss-Ronen, Liat et al., "Characterization of Block Copolymer Self-Assembly: From Solution to Nanoporous Membranes," *Macromolecules*, vol. 45, pp. 9631-9642 (2012).

Park, Miri et al., "Block Copolymer Lithography: Periodic Arrays of ~$10^{11}$ Holes in 1 Square Centimeter," *Science*, vol. 276, pp. 1401-1404 (May 30, 1997).

Peinemann, Klaus-Viktor et al., "Asymmetric superstructure formed in a block copolymer via phase separation," *Nature Materials*, vol. 6, pp. 992-996 (Dec. 2007).

Posselt, Kyle et al., "Synthesis and characterization of dicarboximide-functionalized oxanorbornyl homopolymer and diblock copolymers," Abstracts of Papers, 243rd ACS National Meeting & Exposition, San Diego, CA, United States, Mar. 25-29, 2012.

Richmond, Victoria et al., "Synthesis and characterization of dicarboximide-functorialized oxanorbornyl homopolymers with ethylene oxide side chains," Abstracts of Papers, 247th ACS National Meeting & Exposition, Dallas, TX, United States, Mar. 16-20, 2014.

Riffle, J.S. et al., "Synthesis of hydroxyl-terminated polycarbonates of controlled number-average molecular weight," *Journal of Polymer Science: Polymer Chemistry Edition*, vol. 20, No. 8, pp. 2289-2301 (Aug. 1982) (Abstract).

Sahu, Niranjan et al., "Fundamental understanding and modeling of spin coating process: A review," *Indian Journal of Physics*, vol. 83, No. 4, pp. 493-502 (2009).

Sommer, William, "Olefin Metathesis," Sigma-Aldrich Chemical Co., Inc., *ChemFiles*, vol. 9, No. 6, pp. 3-11 (2009).

Srinivasan, Siddarth et al., "Solution Spraying of Poly(methyl methacrylate) Blends to Fabricate Micro-textured, Superoleophobic Surfaces," Manuscript (downloaded May 19, 2014).

Thurn-Albrecht, Thomas et al., "Nanoscopic Templates from Oriented Block Copolymer Films," *Advanced Materials*, vol. 12, No. 11, pp. 787-791 (2000).

Walheim, Stefan et al, "Structure Formation via Polymer Demixing in Spin-Cast Films," *Macromolecules*, vol. 30, pp. 4995-5003 (1997).

"Polyester ether ketone (PEEK)," Wikipedia, http://en.wikipedia.org/wiki/PEEK, downloaded Jun. 11, 2014.

Yang, Yong-qiang et al., "Preparation of PPESK Hollow Fiber Asymmetric Nanofiltration Membrane," *The Proceedings of the 3$^{rd}$ International Conference on Functional Molecules*, pp. 295-296 (May/Jun. 2011).

Yun, Yanbin et al, "Preparation of an Ultrafiltration Membrane from Poly(Phthalazine Ether Sulfone Ketone)," *Integrated Concepts in Water Recycling*, pp. 741-752 (2005).

Zhang, Yanfeng et al., "PEG-Polypeptide Dual Brush Block Copolymers: Synthesis and Application in Nanoparticle Surface PEGylation," *ACS Macro Letters*, vol. 2, pp. 809-813 (2013).

Barriau et al., "Linear-Hyperbranched Amphiphilic AB Diblock Copolymers Based on Polystyene and Hyperbranched Polyglycerol," *Macromolecular Rapid Communications*, vol. 26, pp. 862-867 (2005).

Killops et al., "Nanopatterning Biomolecules by Block Copolymer Self-Assembly," *MacroLetters*, vol. 1, pp. 758-763 (2012).

Liu et al., "Preparation of Star Block Copolymers with Polystyerene-block-Poly(ethylene oxide) as Side Chains on Hyperbranched Polyglycerol Core by Combination of ATRP with Atom Transfer Nitroxide Radical Coupling Reaction," *Journal of Polymer Science Part A: Polymer Chemistry*, vol. 46, pp. 6754-6761 (2008).

Liu et al., "Preparation of Star Polymers of Hyperbranched Polyglycerol Core with Multiarms of PS-b-PtBA and PS-b-PAA," *Journal of Applied Polymer Science*, vol. 108, pp. 777-784 (2008).

\* cited by examiner

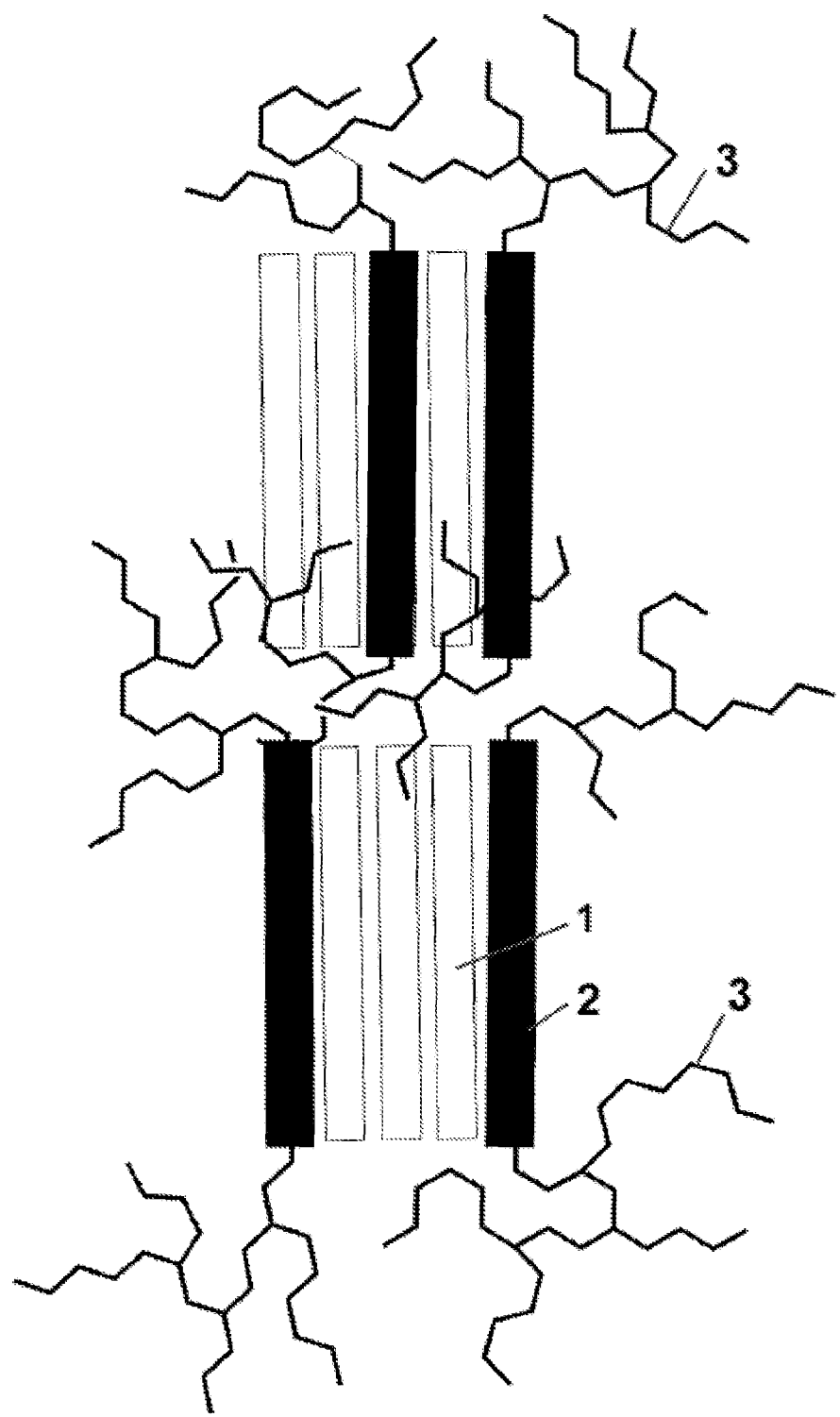

HYDROPHILIC BLOCK COPOLYMERS AND METHOD OF PREPARATION THEREOF (III)

BACKGROUND OF THE INVENTION

Aromatic polymers such as polysulfone, polyethersulfone, poly(phthalazine ether sulfone ketone), and polyether ether ketone are useful for preparing porous membranes due to their chemical stability, processability, mechanical strength, flexibility, and thermal stability. Since these polymers are generally hydrophobic, membranes prepared from these polymers are hydrophobic, and thus lack desirable surface properties such as wettability, low protein adsorption, thromboresistance, and controlled surface chemical reactivity.

Attempts have been made to improve one or more of the surface properties of membranes made from the aromatic polymers. For example, membranes have been treated with high energy radiation or plasma to impart hydrophilicity. In other examples, hydrophilic monomers have been grafted to hydrophobic membrane surfaces. Attempts also have been made to coat the hydrophobic membrane with water soluble polymers such as polyethylene glycol or polyvinyl pyrrolidone. The above attempts for improving properties, particularly hydrophilicity, however, have one or more drawbacks such as lack of reproducibility, lack of stability of the modification, and/or pore clogging.

The foregoing shows that there is an unmet need for hydrophilic porous membranes formed from aromatic hydrophobic polymers and for a method of imparting hydrophilicity to membranes formed from aromatic hydrophobic polymers.

BRIEF SUMMARY OF THE INVENTION

The invention provides hydrophilic block copolymers which are useful in imparting hydrophilicity to membranes formed from aromatic hydrophobic polymers.

The invention provides a block copolymer of the formula: A-B-A (I) or A-B (II), wherein block A is: (i) a copolymer of glycidol and allyl glycidyl ether, the copolymer having one or more allyl groups; or (ii) a copolymer of glycidol and allyl glycidyl ether, wherein one or more of the allyl groups of the copolymer have been replaced with 1,2-dihydroxypropyl group or a group of the formula: $-(CH_2)_a-S-(CH_2)_b-X$, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula $-C(H)(COOH)(NH_2)$, and a group of the formula $-C(H)(COOH)(NHAc)$, or a salt thereof; and block B is an aromatic hydrophobic polymeric segment.

The invention also provides a method of preparing a block copolymer of the formula: A-B-A (I) or A-B (II), wherein block A is a copolymer of glycidol and allyl glycidyl ether, the copolymer having one or more allyl groups; and block B is an aromatic hydrophobic polymeric segment, the method comprising: (i) providing an aromatic hydrophobic polymeric segment having one or more terminal functional groups; and (ii) carrying out ring opening polymerization of allyl glycidyl ether and glycidol on the aromatic hydrophobic polymeric segment in the presence of a base.

The present invention has one or more of the following advantages. The invention provides a facile method for tuning the degree of hydrophilicity desired in a porous membrane. Block copolymers of various degrees of hydrophilicity are produced from aromatic hydrophobic polymers. The composition of the block copolymers is readily characterized by well known techniques. The porous membranes prepared using the block copolymers are low in extractables. The block copolymers have strong adhesion to aromatic hydrophobic polymers. The porous membranes are stable to process conditions such as autoclaving, steaming, and isopropanol (IPA) extraction.

BRIEF DESCRIPTION OF THE SEVERAL VIEWS OF THE DRAWING(S)

FIG. 1 illustrates a role of a block copolymer in accordance with an embodiment of the invention as a wetting agent in forming a porous membrane from an aromatic hydrophobic polymer. 1 represents an aromatic hydrophobic polymer, 2 represents the aromatic hydrophobic polymeric segment of the block copolymer in accordance with an embodiment of the invention, and 3 represents the hydrophilic polymeric segment of the block copolymer.

DETAILED DESCRIPTION OF THE INVENTION

In accordance with an embodiment, the invention provides a block copolymer of the formula: A-B-A (I) or A-B (II), wherein block A is:

(i) a copolymer of glycidol and allyl glycidyl ether, the copolymer having one or more allyl groups; or (ii) a copolymer of glycidol and allyl glycidyl ether, wherein one or more of the allyl groups of the copolymer have been replaced with 1,2-dihydroxypropyl group or a group of the formula: $-(CH_2)_a-S-(CH_2)_b-X$, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula $-C(H)(COOH)(NH_2)$, and a group of the formula $-C(H)(COOH)(NHAc)$, or a salt thereof; and block B is an aromatic hydrophobic polymeric segment.

In accordance with an embodiment, block A is a copolymer of glycidol and allyl glycidyl ether, the copolymer having one or more allyl groups. In accordance with an embodiment, block A is composed of polyglycerol segments having one or more of the following repeat units:

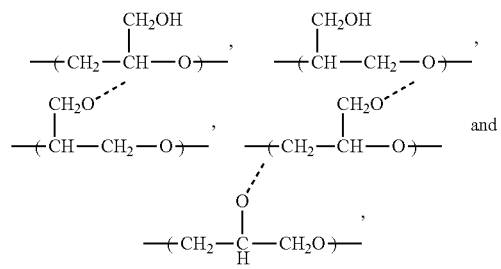

and of poly allyl glycidyl ether segments having a repeat unit of the formula:

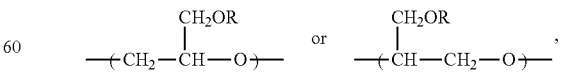

wherein R is allyl.

In accordance with another embodiment, block A is a copolymer of glycidol and allyl glycidyl ether, as described above, wherein one or more of the allyl groups of the copolymer have been replaced with 1,2-dihydroxypropyl group or a group of the formula: —(CH$_2$)$_a$—S—(CH$_2$)$_b$—X, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)(NH$_2$), and a group of the formula —C(H)(COOH)(NHAc), or a salt thereof.

In accordance with an embodiment, X can be any acidic group, for example, sulfonic acid, phosphoric acid, phosphonic acid, or carboxylic acid, the basic group can be any basic group, for example, an amino group, an alkylamino group, or a dialkylamino group, the cation can be any cationic group, for example, a quaternary ammonium group, and the zwitterion can be, for example, a quaternary ammonium alkyl sulfonate group of the formula —N$^+$(R$^1$R$^2$)(CH$_2$)$_c$SO$_3^-$, wherein R$^1$ and R$^2$ are alkyl groups and c is 1 to 3.

One or more of the allyl groups on the block copolymers can be reacted with a suitable agents to effect the desired changes. For example, the allyl group can be converted to 1,2-dihydroxypropyl groups by reacting with an oxidizing agent such as osmium tetroxide, alkaline permanganate, or hydrogen peroxide.

The allyl group can be converted to a group of the formula: —(CH$_2$)$_a$—S—(CH$_2$)$_b$—X, wherein a is 3 and b is 1 to 3, and X is an acidic group by reacting the allyl group with an acid group bearing thiol such as HS—(CH$_2$)$_b$—X, wherein X is COOH, PO$_4$H, PO$_3$H, or SO$_3$H, wherein b is 1 to 3.

The allyl group can be converted to a group of the formula: —(CH$_2$)$_a$—S—(CH$_2$)$_b$—X, wherein a is 3 and b is 1 to 3, and X is a basic group by reacting the allyl group with a basic group bearing thiol such as HS—(CH$_2$)$_b$—X, wherein X is NH$_2$, NHR, or NRR, where R is a C$_1$-C$_6$ alkyl group, and b is 1 to 3.

The allyl group can be converted to a group of the formula: —(CH$_2$)$_a$—S—(CH$_2$)$_b$—X, wherein a is 3 and b is 1 to 3, and X is a cationic group by reacting the allyl group with a cationic group bearing thiol such as HS—(CH$_2$)$_b$—X, wherein X is NH$_3^+$, NHRR$^+$, or NRRR$^+$, where R is a C$_1$-C$_6$ alkyl group, and b is 1 to 3.

The allyl group can be converted to a group of the formula: —(CH$_2$)$_a$—S—(CH$_2$)$_b$—X, wherein a is 3 and b is 1 to 3, and X is a zwitterionic group by reacting the allyl group with a zwitterionic group bearing thiol such as HS—(CH$_2$)$_b$—X, wherein X is group bearing a zwitterion, for example, —N$^+$(R)$_2$—(CH$_2$)$_c$—SO$_3^-$, where R is a C$_1$-C$_6$ alkyl group, and b and c are independently 1 to 3.

One or more of the allyl groups can be replaced by reacting with a haloalkane thiol, for example, with a fluoroalkane thiol, a chloroalkane thiol, a bromoalkane thiol, or an iodoalkane thiol. The acyl group of acyl alkane thiol can be formyl, acetyl, propionyl, or butanoyl. The alkoxy part of alkoxy alkane thiol can be a C$_1$-C$_6$ alkoxy group. The alkylthio part of alkylthio alkane thiol can be a C$_1$-C$_6$ alkyl group.

In an embodiment, one or more of the allyl groups can be reacted with a carboxylic alkane thiol or a salt thereof, a phosphoric alkane thiol or a salt thereof, a phosphonic alkane thiol or a salt thereof, a sulfonic alkane thiol or a salt thereof, a (dialkylamino)alkane thiol or a salt thereof, an aminoalkane thiol or a salt thereof, an alkylamino alkane thiol, a dialkylaminoalkane thiol, and a sulfonic alkylammonium alkane thiol or a salt thereof.

In accordance with an embodiment, the aromatic hydrophobic polymeric segment of the block copolymer is selected from polysulfone, polyethersulfone, polyphenylene ether, polyphenylene oxide, polycarbonate, poly(phthalazinone ether sulfone ketone), polyether ketone, polyether ether ketone, polyether ketone ketone, polyimide, polyetherimide, and polyamide-imide, preferably polyethersulfone.

Embodiments of the hydrophobic polymer segments include polysulfone (PS), polyethersulfone (PES), polycarbonate (PC), polyether ether ketone (PEEK), poly(phthalazinone ether sulfone ketone) (PPESK), polyphenylene sulfide (PPS), polyphenylene ether (PPE), polyphenylene oxide (PPO), and polyether-imide (PEI), which have the following structures:

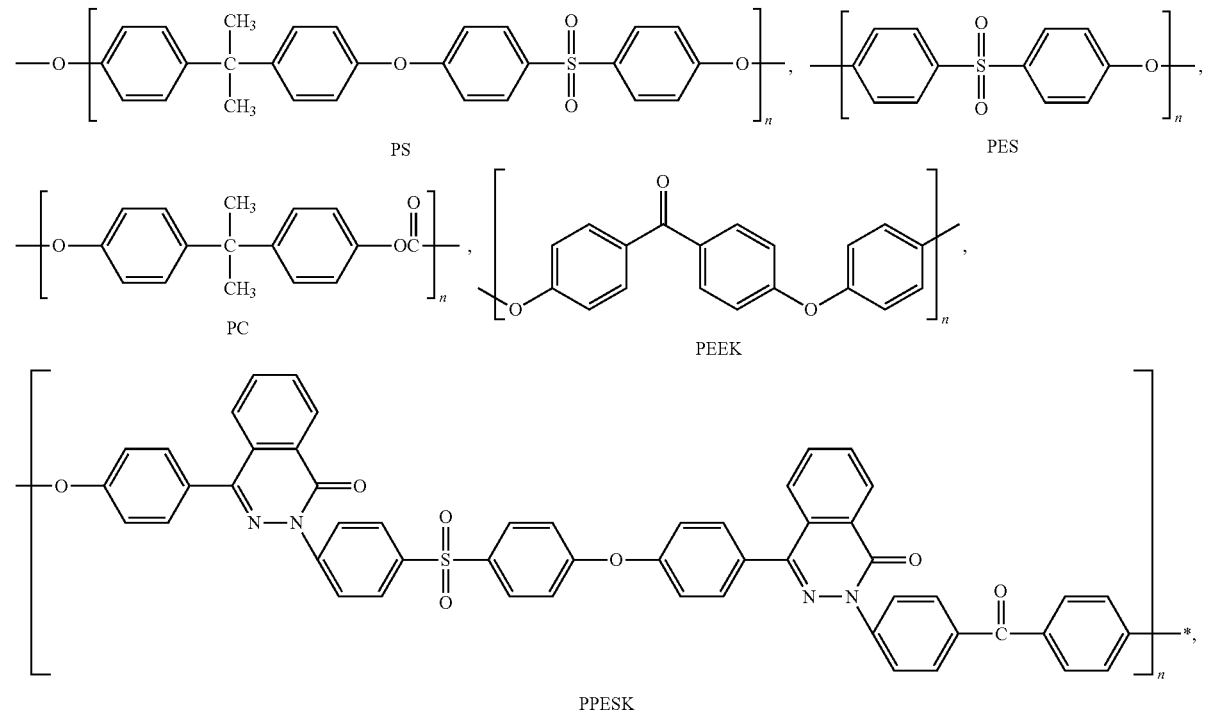

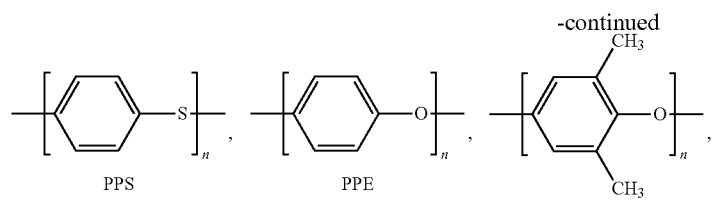
PPS, PPE, PPO
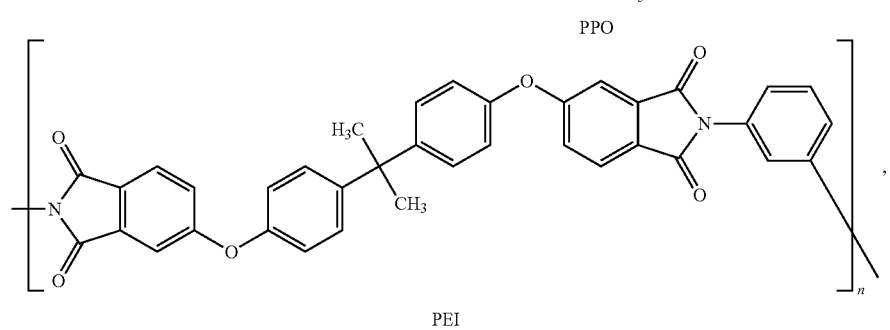
PEI
The number of repeat units, n, within each of the above aromatic hydrophobic segments can be from about 10 to about 1000, preferably from about 30 to about 300, and more preferably from about 50 to about 250.
In accordance with an embodiment, block A is a branched copolymer.
In accordance with an embodiment the block copolymer has the following structure:

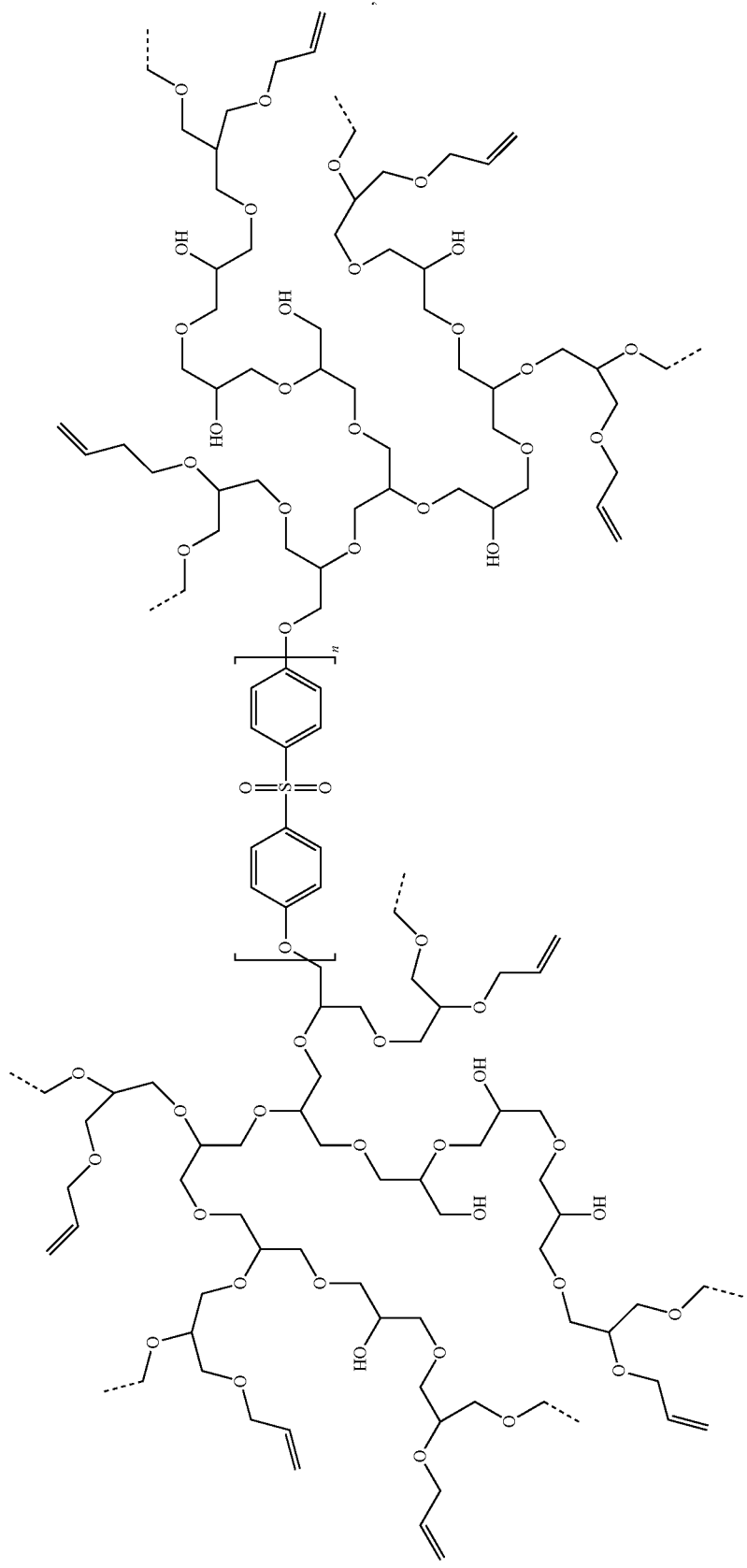
PES-Pg/PolyAGE wherein n is 10 to 1000, preferably about 50 to 175, and more preferably about 60 to about 100. "Pg/PolyAGE" designates a copolymer of glycidol and allyl glycidyl ether.

In an embodiment where polysulfone is the aromatic hydrophobic segment, n is about 10 to about 1000, preferably about 30 to about 225, and more preferably about 45 to about 130.

In accordance with an embodiment, block A is present in the copolymer in an amount of about 20 to about 50 mol % and block B is present in an amount of about 50 to about 80 mol %. Preferably, block A is present in an amount of about 40 to about 55 mol % and block B is present in an amount of about 40 to about 60 mol %.

In accordance with an embodiment, the block copolymer has the following structure:

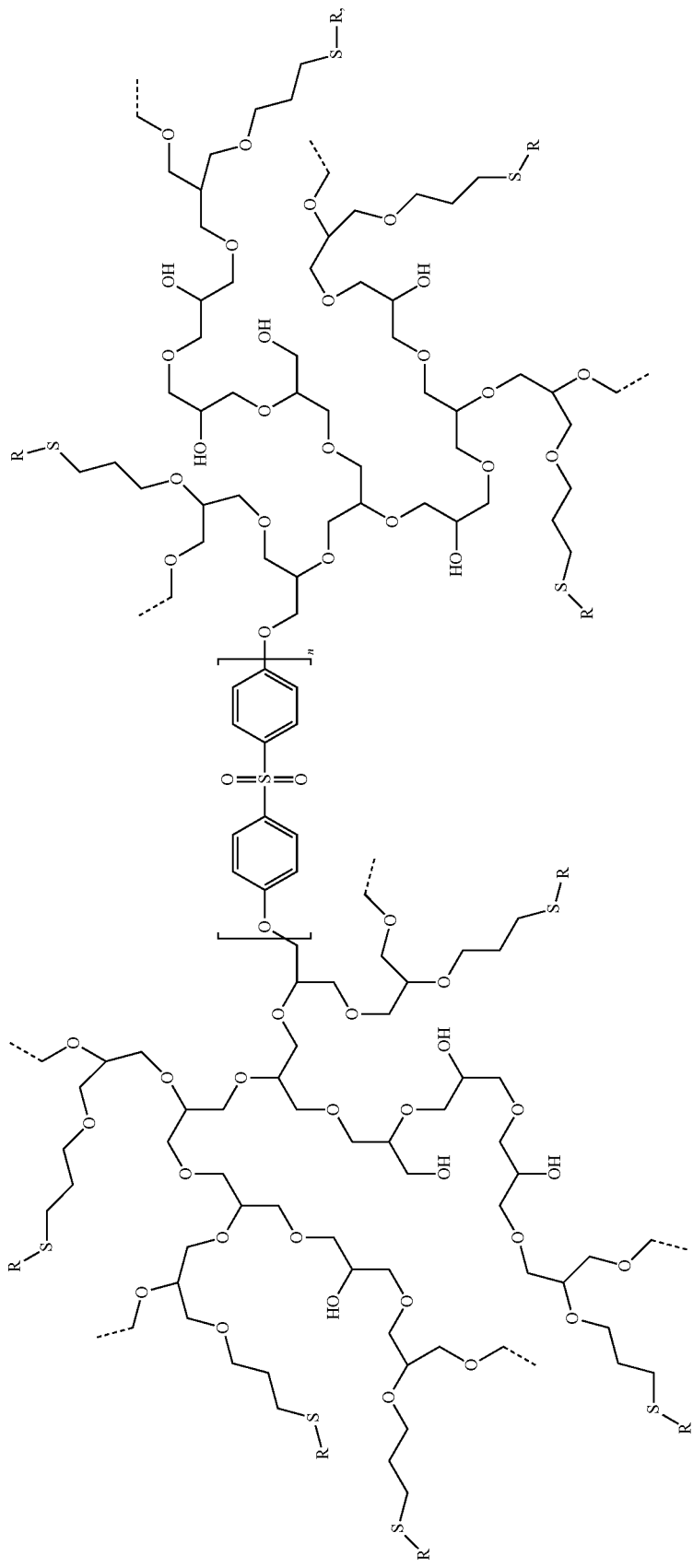

wherein R is allyl or —(CH$_2$)$_b$—X, wherein X is selected from amino, dimethylamino, —CH$_2$CH$_2$SO$_3$H, —CH$_2$CH$_2$CH$_2$SO$_3$H, —CH$_2$CO$_2$H, and —CH$_2$CH$_2$N$^+$(CH$_3$)$_3$, and combinations thereof, and n is about 10 to about 1000, preferably from about 30 to about 300, and more preferably from about 50 to about 250. "Pm" designates a copolymer of glycidol and allyl glycidyl ether.

The block copolymer in accordance with an embodiment of the invention has one of the following structures:

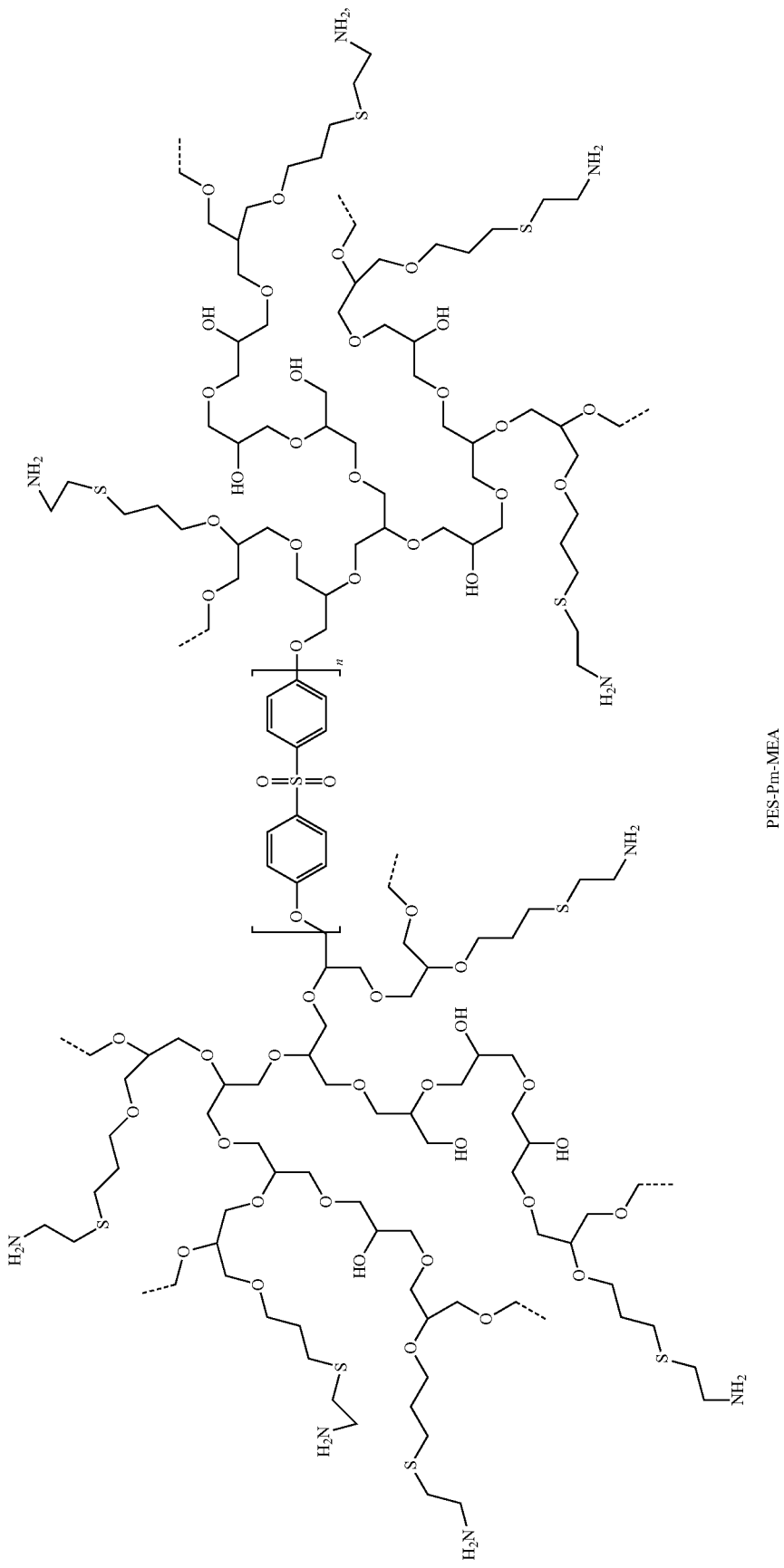

-continued
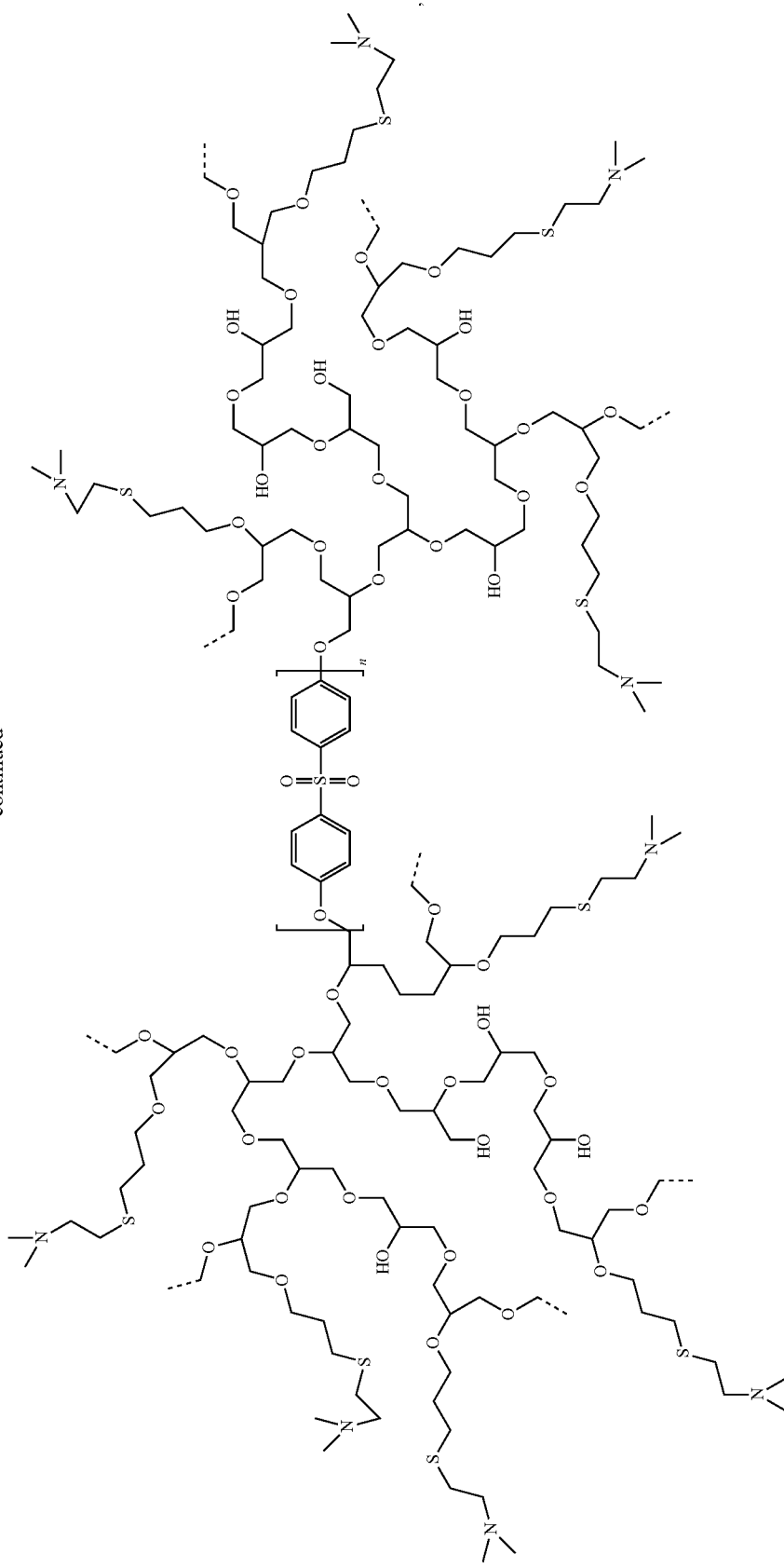
PES-P$_m$-MDAME

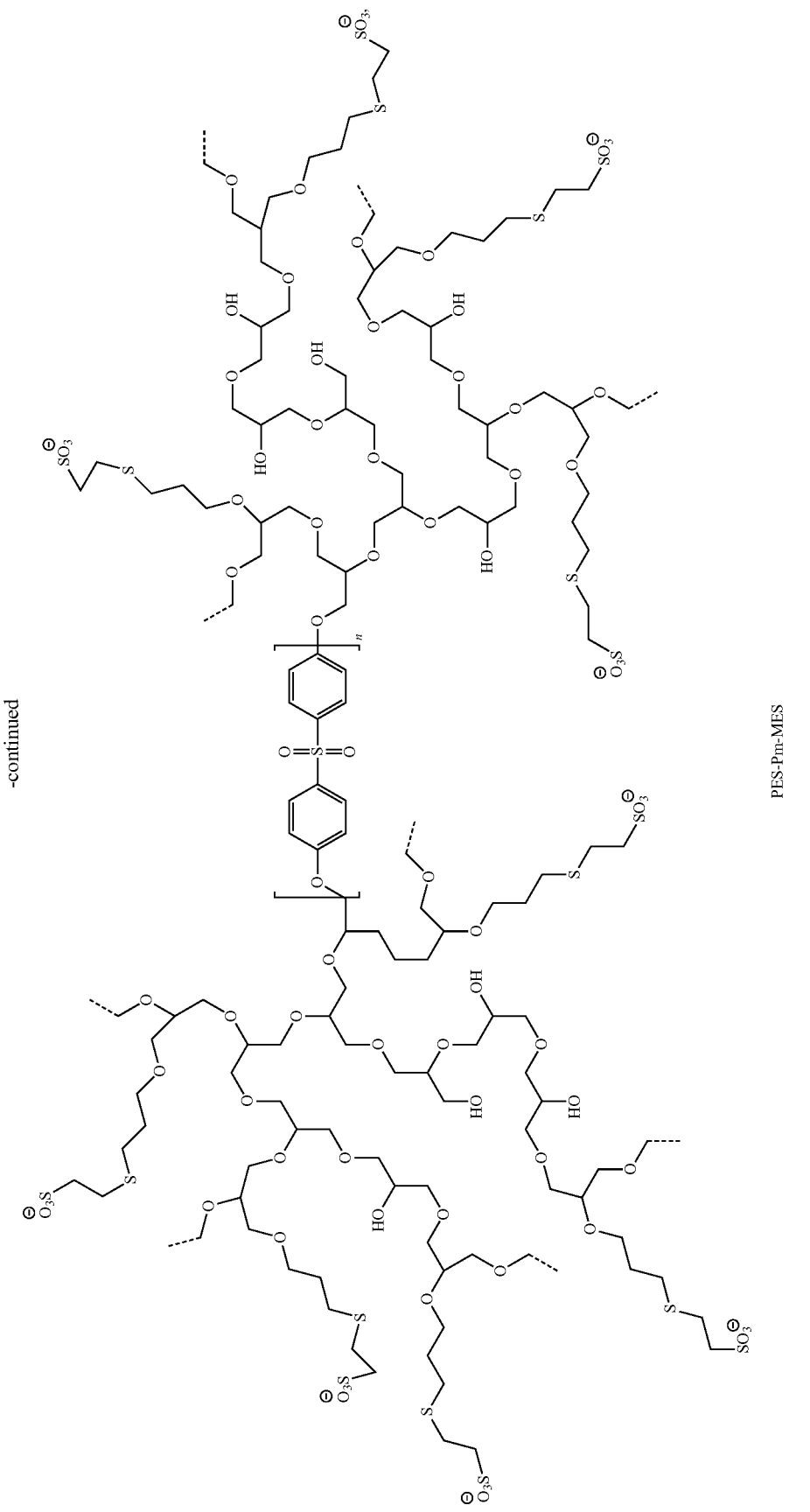

-continued
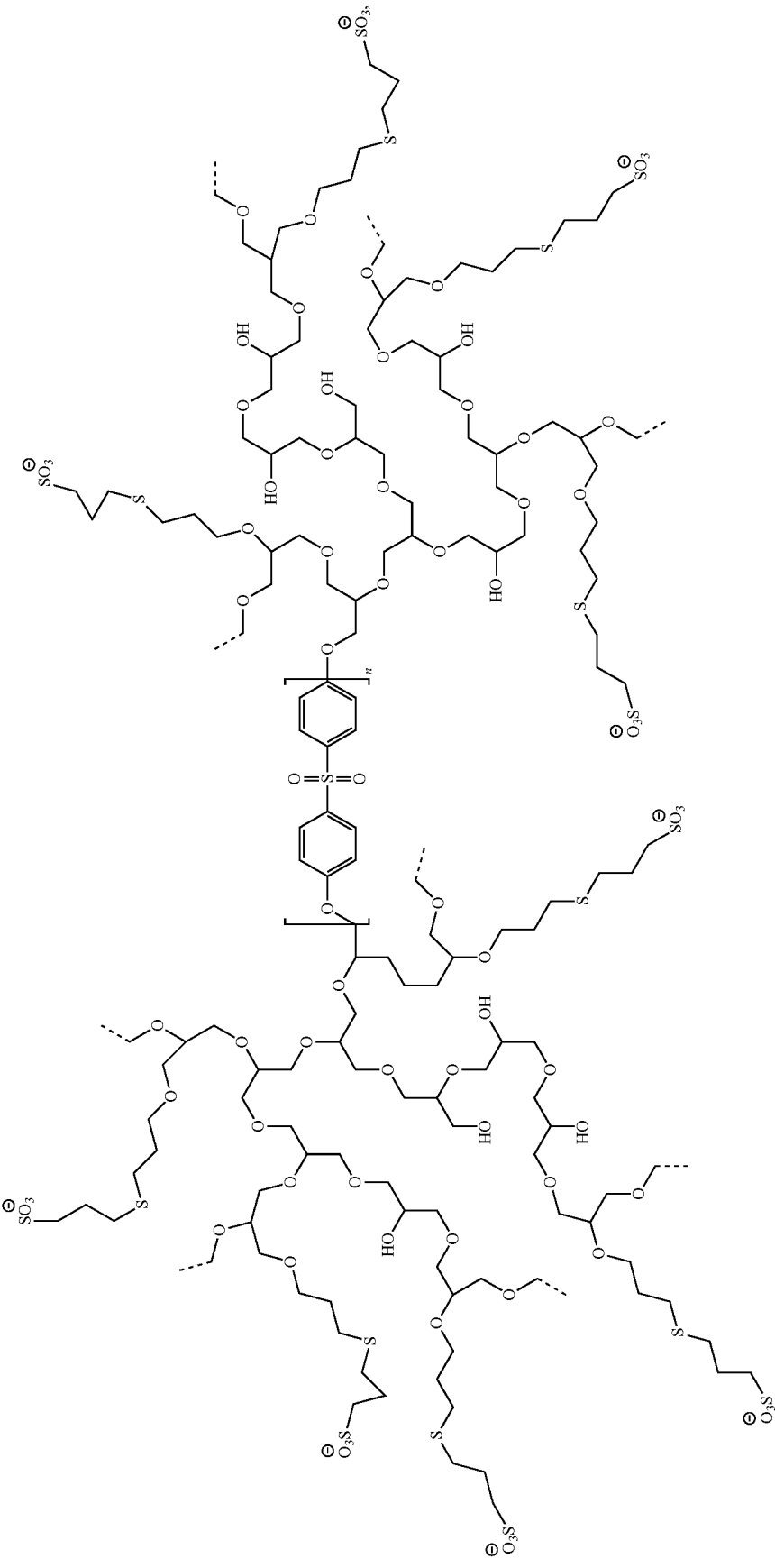
PES-Pm-MPS

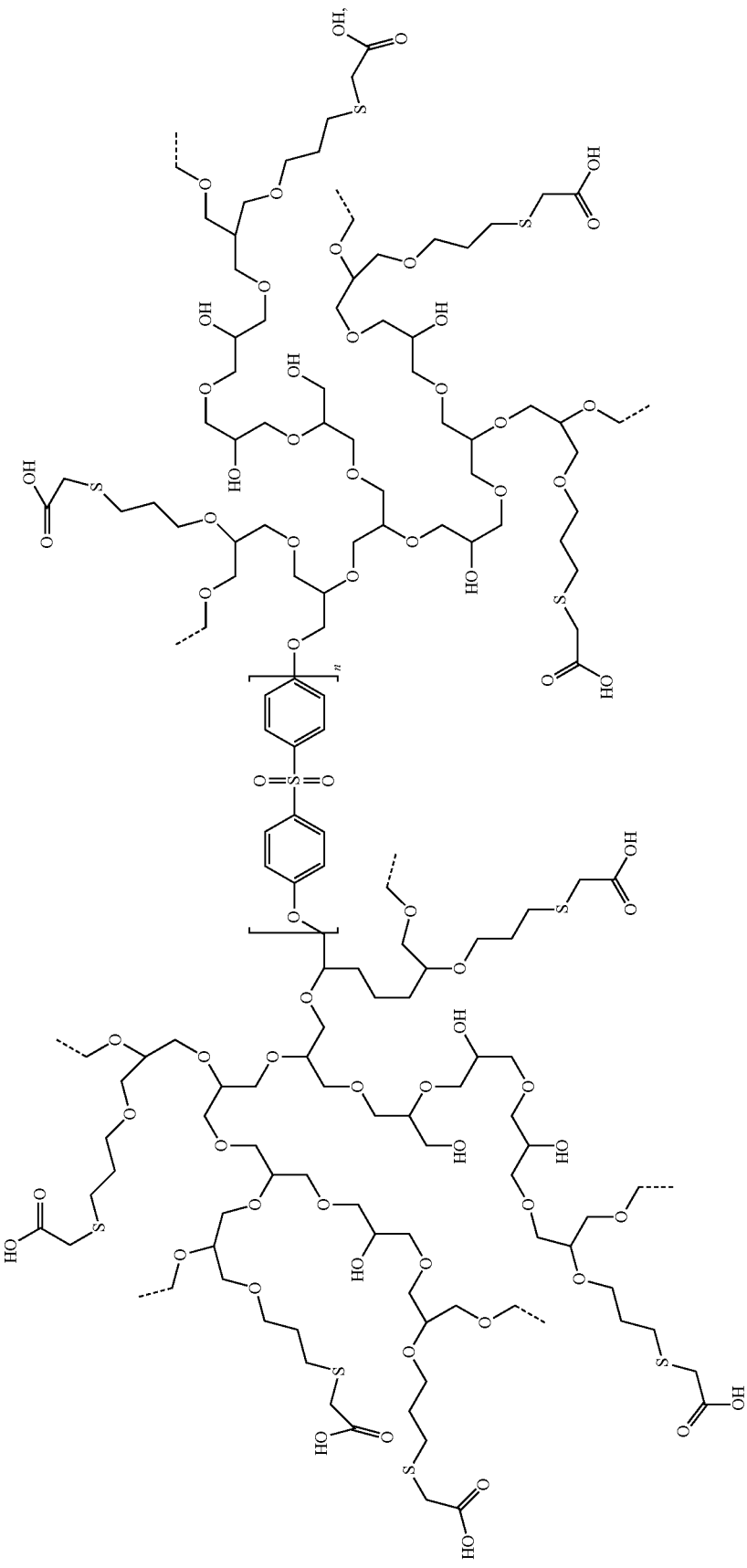
PES-Pm-MDAME wherein n is about 10 to about 1000, preferably from about 30 to about 300, and more preferably from about 50 to about 250.

The invention also provides a method of preparing a block copolymer of the formula: A-B-A (I) or A-B (II), wherein block A is a copolymer of glycidol and allyl glycidyl ether, the copolymer having one or more allyl groups; and block B is an aromatic hydrophobic polymeric segment, the method comprising:

(i) providing an aromatic hydrophobic polymeric segment having one or more terminal functional groups selected from hydroxy, mercapto, and amino groups; and (ii) carrying out ring opening polymerization of allyl glycidyl ether and glycidol on the aromatic hydrophobic polymeric segment.

The invention also provides a method of preparing a block copolymer of the formula: A-B-A (I) or A-B (II), wherein block A is a copolymer of glycidol and allyl glycidyl ether, wherein one or more of the allyl groups of the copolymer have been replaced with 1,2-dihydroxypropyl group or a group of the formula: —$(CH_2)_a$—S—$(CH_2)_b$—X, wherein a is 3 and b is 1 to 3, and X is a group selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)($NH_2$), and a group of the formula —C(H)(COOH)(NHAc), or a salt thereof; and B is an aromatic hydrophobic polymeric segment;

the method comprising:

(i) providing a block copolymer of the formula: A-B-A (Ia) or A-B (IIa), wherein block A is a copolymer of glycidol and allyl glycidyl ether, the copolymer comprising one or more allyl groups; and block B comprises an aromatic hydrophobic polymeric segment, and (ii) reacting the block copolymer of formula (Ia) or (IIa) with an agent selected from an oxidizing agent, a carboxyl alkane thiol or a salt thereof, a sulfonic alkane thiol or a salt thereof, a (dialkylamino)alkane thiol or a salt thereof, a haloalkane thiol, hydroxyalkane thiol, an acyl alkane thiol, an alkoxy alkane thiol, an alkylthio alkane thiol, an aldehydo alkane thiol, an amidoalkane thiol, a carbamoyl alkane thiol, an ureido alkane thiol, a cyanoalkane thiol, a nitro alkane thiol, an epoxy alkane thiol, cysteine, an acyl cysteine, an aminoalkane thiol or a salt thereof, an alkylamino alkane thiol, a dialkylaminoalkane thiol, and a sulfonic alkylammonium alkane thiol or a salt thereof.

In accordance with an embodiment, the aromatic hydrophobic polymeric segment is selected from polysulfone, polyethersulfone, polyphenylene ether, polyphenylene oxide, polycarbonate, poly(phthalazinone ether sulfone ketone), polyether ketone, polyether ether ketone, polyether ketone ketone, polyimide, polyetherimide, and polyamide-imide, preferably polyethersulfone. The aromatic hydrophobic polymeric segment comprises one or more, preferably one or two, terminal functional groups selected from hydroxy, mercapto, or amino groups.

The functional groups can be provided on the aromatic hydrophobic segments by methods known to those skilled in the art. For example, hydroxy-terminated polyether imide synthesis is described in U.S. Pat. Nos. 4,611,048 and 7,230,066. Thus, for example, hydroxy-terminated polyether imides can be prepared by the reaction of a bis-ether anhydride and a diamine, followed by reaction with an amino alcohol. Illustratively, a hydroxy-terminated polyether imide can be prepared by the reaction of bis(4-(3,4-dicarboxy-phenoxy)phenyl)propane dianhydride and m-phenylenediamine, followed by reaction with p-aminophenol.

Amine-terminated polyether imides can be prepared by the reaction of a bis-ether anhydride and a diamine. Thus, for example, bis(4-(3,4-dicarboxy-phenoxy)phenyl)propane dianhydride and m-phenylenediamine can be reacted to produce an amine terminated polyether imide. See, for example, U.S. Pat. No. 3,847,867.

Hydroxy-terminated PEEK is described in *Journal of Polymer Science Part B* 2006, 44, 541 and *Journal of Applied Science* 2007, 106, 2936. Thus, for example, hydroxy-terminated PEEK with pendent tert-butyl groups can be prepared by the nucleophilic substitution reaction of 4,4'-difluorobenzophenone with tert-butyl hydroquinone with potassium carbonate as catalyst.

Hydroxy-terminated polycarbonate is described in *Journal of Polymer Science: Polymer Chemistry Edition* 1982, 20, 2289. Thus, for example, hydroxy-terminated polycarbonate can be prepared by the reaction of bisphenol A and phosgene, with in situ blocking of some of the phenolic groups either prior to or during phosgenation. Trimethylchlorosilane, trifluoroacetic anhydride, or trifluoroacetic acid can be used for the blocking. The blocking group can be removed at the end of the polymerization.

Hydroxy-terminated PPO can be prepared as described in U.S. Pat. No. 3,318,959. Thus, for example, poly-2,6-dimethylphenylene ether can be reacted with sodium hydroxide to obtain a PPO having a hydroxyl content of 2.3 to 3 hydroxyl groups per molecule.

In an embodiment, the aromatic hydrophobic polymeric segment is polyethersulfone having one or more hydroxy groups is of the formula:

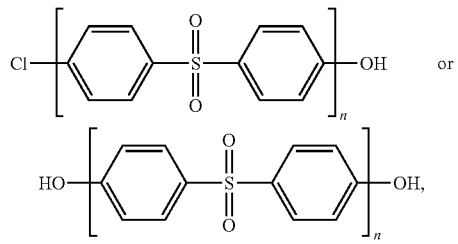

wherein n is about 10 to about 1000, preferably about 50 to 175, and more preferably about 60 to about 100.

Polyethersulfone is commercially available, for example, as VIRANTAGE™ VW-10700 from Solvay, with the formula

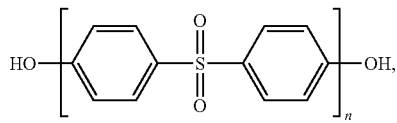

which has a GPC molecular weight 21000 g/mol and OH end groups of 210 μeq/g;

as VIRANTAGE VW-10200 from Solvay with the formula

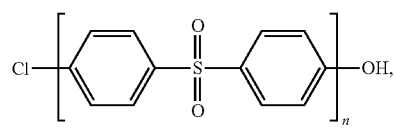

which has a GPC molecular weight of 44,200 g/mol and OH end groups of 80 µeq/g; and as SUMIKAEXCEL™ 5003PS from Sumitomo with the formula

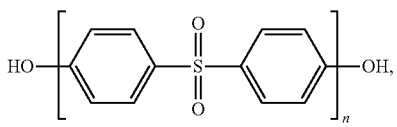

which has a reduced viscosity of 0.50 [1% PES dissolved in DMF] and OH end groups in the range of 0.6-1.4 per molecule.

Glycidol or 2,3-epoxy-1-propanol contains one epoxide ring and one hydroxyl group as functional end groups. Both ends are capable of reacting with each other to form macromolecules which are glycerol derivatives. The resulting macromolecules continue to react to form polyglycerol. Allyl glycidyl ether contains one epoxide ring, which is capable of undergoing ring opening polymerization.

The opening of the epoxide ring of glycidol or allyl glycidyl ether is initiated by the nucleophile, i.e., oxide anion, amino group, or sulfide anion, of the aromatic hydrophobic polymeric segment, which is present as the terminal functional group (amino group) or is produced by the reaction of the terminal group (OH or SH) on the aromatic hydrophobic polymeric segment with the base employed in the reaction. The ring opened epoxide continues to open the epoxide of the next glycidol and/or allyl glycidyl ether in the presence of a base, and the polymerization of glycidol and allyl glycidyl ether proceeds in this manner. When SH acts as a nucleophile, the use of a base is optional. When an amino group is the nucleophile, then a base is not required.

The ring opening polymerization can be carried out with any suitable base, for example, a base selected from potassium carbonate, sodium carbonate, cesium carbonate, sodium tertiary butoxide, potassium tertiary butoxide, tetramethylammonium hydroxide, ammonium hydroxide, tetrabutylammonium hydroxide, sodium hydroxide, potassium hydroxide, lithium hydroxide, barium carbonate, barium hydroxide, cesium hydroxide, lithium carbonate, magnesium carbonate, magnesium hydroxide, sodium amide, lithium amide, and combinations thereof.

In accordance with an embodiment, the ring opening polymerization can be carried in a suitable solvent, particularly a polar aprotic solvent. Examples of suitable solvents include N,N-dimethylacetamide, N,N-dimethylformamide, dimethyl sulfoxide, and N-methylpyrrolidone, and mixtures thereof.

The amount of the aromatic hydrophobic polymer, glycidol, and allyl glycidyl ether can be present in the polymerization medium at any suitable concentration, for example, each can be present at a concentration of about 5% to about 60% or more, preferably about 10% to about 50%, and more preferably about 20% to about 40%, by weight. In an embodiment, the concentration of each is about 30% by weight.

The ring opening polymerization is conducted such that the ratio of the hydrophobic polymeric segment to glycidol, and allyl glycidyl ether in the reaction mixture is preferably about 1:0.1:0.1 to about 1:2:2, more preferably about 1:0.7:0.7 to about 1:1.2:1.2, and even more preferably about 1:0.8:0.8.

The ring opening polymerization is conducted at a suitable temperature, for example, from 25° C. to about 130° C., preferably about 50° C. to about 120° C., and more preferably about 90° C. to about 110° C.

The polymerization can be carried out for any suitable length of time, for example, about 1 hr to about 100 hrs, preferably about 2 hrs to about 40 hrs, more preferably about 3 hrs to about 20 hrs. The polymerization time can vary depending on, among others, the degree of polymerization desired and the temperature of the reaction mixture.

The block copolymer can be isolated from the reaction mixture by precipitation with a nonsolvent, e.g., methanol. The resulting polymer is dried to remove any residual solvent or nonsolvent.

The block copolymer can be combined with an aromatic hydrophobic polymer and cast as a thin films and effect phase inversion to obtain porous membranes.

The present invention further provides a porous membrane comprising an aromatic hydrophobic polymer and a block copolymer as described above. The present invention further provides a method of preparing a porous membrane comprising an aromatic hydrophobic polymer and a block copolymer, the method comprising:

(i) providing a polymer solution comprising a solvent, said aromatic hydrophobic polymer, and said block copolymer;
(ii) casting the polymer solution as a thin film;
(iii) subjecting the thin film to phase inversion to obtain a porous membrane; and optionally
(iv) washing the porous membrane.

The polymer solution for preparing a membrane contains a polymer and a block copolymer as a wetting agent. Typical polymer solutions comprise at least one solvent, and may further comprise at least one nonsolvent. Suitable solvents include, for example, N,N-dimethylformamide (DMF); N,N-dimethylacetamide (DMAc); N-methyl pyrrolidone (NMP); dimethyl sulfoxide (DMSO), methyl sulfoxide, tetramethylurea; dioxane; diethyl succinate; chloroform; and tetrachloroethane; and mixtures thereof. Suitable nonsolvents include, for example, water; various polyethylene glycols (PEGs; e.g., PEG-200, PEG-300, PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; acids, such as acetic acid, citric acid, and lactic acid; and various salts, such as calcium chloride, magnesium chloride, and lithium chloride; and mixtures thereof.

Typical casting solutions contain the polymer in the range of about 10 wt % to about 35 wt % resin, in the range of from about 0.1 to about 10 wt %, preferably about 0.2% to about 2%, and more preferably about 0.3% to about 1% of the hydrophilic block copolymer, in the range of from about 0 to about 90 wt % NMP, in the range of from about 0 to about 90 wt % DMF, and in the range of from about 0 to about 90 wt % DMAc.

Suitable components of casting solutions are known in the art, which may be used as desired. Illustrative solutions comprising polymers, and illustrative solvents and nonsolvents include those disclosed in, for example, U.S. Pat. Nos. 4,629,563; 4,900,449; 4,964,990, 5,444,097; 5,846,422; 5,906,742; 5,928,774; 6,045,899; and 7,208,200.

The casting solution is cast as a flat sheet on a glass plate or on a moving substrate such as a moving belt. Alternatively, the casting solution is cast as a hollow fiber.

Phase inversion can be effected by any known method. Phase inversion can include evaporation of the solvent and nonsolvent (dry process); exposure to a nonsolvent vapor, such as water vapor, which absorbs on the exposed surface (vapor phase-induced precipitation process); quenching in a nonsolvent liquid, generally water (wet process); or thermally quenching a hot film so that the solubility of the polymer is suddenly greatly reduced (thermal process).

In an embodiment, phase inversion is effected by exposing the cast solution to a non-solvent vapor, for example, an atmosphere of controlled humidity, following which the cast solution is immersed in a nonsolvent bath such as water bath.

Alternatively, hydrophobic membrane can be coated with a hydrophilic block polymer. Thus, for example, a solution of the block copolymer is coated on a porous membrane formed from an aromatic hydrophobic polymer, or a porous membrane dipped in a solution of the block copolymer, and optionally, heated, to obtain a hydrophilic modified porous membrane.

As illustrated in FIG. 1, the microstructure of the porous membrane in accordance with an embodiment of the invention includes the hydrophilic segments 3 on the pore surfaces of the membrane, thereby improving the hydrophilicity of the membrane. The aromatic hydrophobic polymeric segment 2 of the block copolymer orients itself [Agree?] with the aromatic hydrophobic polymer 1.

Porous membranes according to embodiments of the invention have a critical wetting surface tension (CWST) of about 70 to about 90 dynes/cm or more, for example, 72, 74, 76, 78, 80, 82, 84, or 86 dynes/cm.

Porous membranes according to embodiments of the invention find use in as microfiltration or ultrafiltration membranes or in the preparation of nanofiltration membranes, reverse osmosis membranes, gas separation membranes, pervaporation or vapor permeation membranes, dialysis membranes, membrane distillation, chromatography membranes, and/or forward osmosis membranes and pressure retarded osmosis membranes.

Porous membranes according to embodiments of the invention have a pore size of about 0.05 µm to about 10 µm or more and find use as microfiltration membranes. Porous membranes according to certain embodiments of the invention have a pore size of about 1 nm to about 0.5 µm and find use as nanofiltration membranes.

Porous membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the invention can be used in a variety of devices, including surgical devices and products, such as, for example, ophthalmic surgical products.

In accordance with embodiments of the invention, the porous membrane can have a variety of configurations, including planar, flat sheet, pleated, tubular, spiral, and hollow fiber.

Porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The following examples further illustrate the invention but, of course, should not be construed as in any way limiting its scope.

EXAMPLE 1

This example illustrates the preparation of a block copolymer in accordance with an embodiment of the invention.

BASF ULTRASON™ E6020 (500 g) polyethersulfone was added slowly to DMAc (1.5 L) in a 3 L reactor fitted with an overhead stirrer at 110° C. After complete dissolution of the polymer, $K_2CO_3$ (12.5 g) was added. After additional 2.5 hrs of stirring at 110° C. a mixture of allyl glycidyl ether (400 mL) and glycidol (100 mL) were added, and the reaction mixture stirred at 110° C. for 12 hours. The hot reaction mixture was added slowly to vigorously stirred distilled water (15 L). The product obtained was filtered, and further stirred in ethanol (5 L) overnight. The precipitate was filtered, washed with ethanol (2 L) and dried in a vacuum oven at 50° C. overnight to yield 760 g of the block copolymer product (PES-Pg/PolyAGE) with 61 mol % of PES block and 39 mol % of block A containing polymerized glycidol and allylglycidyl ether, as determined by proton NMR spectroscopy.

EXAMPLE 2

This example illustrates the preparation of another block copolymer in accordance with an embodiment of the invention.

Sumitomo 5003PS (200 g) polyethersulfone was added slowly to DMAc (0.5 L) at 110° C. After complete dissolution of the polymer, $K_2CO_3$ (12.5 g) was added. After additional 2.5 hrs of stirring at 110° C. a mixture of allyl glycidyl ether (160 mL) and glycidol (40 mL) were added, and the reaction mixture stirred at 110° C. for 12 hours. The hot reaction mixture was added slowly to vigorously stirred distilled water (7 L). The product obtained was filtered, and further stirred in ethanol (1.5 L) overnight. The precipitate was filtered, washed with ethanol (0.75 L) and dried in a vacuum oven at 50° C. overnight to yield 260 g of the block copolymer product, PES-Pg/PolyAGE, with 57 mol % of PES and 43 mol % of block A containing polymerized glycidol and allyl glycidyl ether, as determined by proton NMR spectroscopy.

EXAMPLE 3

This example illustrates the preparation of another block copolymer in accordance with an embodiment of the invention, PES-Pm-MEA.

30 g of PES-Pg/PolyAGE from Example 1 was dissolved in DMAc (100 mL) at 80° C. After complete dissolution of the polymer, the solution was purged with nitrogen for 5 minutes. Aminoethanethiol hydrochloride (3 g) and 2,2'-azobis(2-methylpropionamidine)dihydrochloride (50 mg) were added and the reaction mixture was stirred at 80° C. for 21 hours. The hot reaction mixture was precipitated by drop-wise addition to ethanol (750 mL). The resulting precipitate was reconstituted in ethanol (250 mL) and further stirred for 2 hours. The resulting precipitate was filtered and dried in a vacuum oven at 50° C. overnight to yield 32 g of the desired product, PES-Pm-MEA, with 61 mol % of PES, 28 mol % of aminoethanethiol group and 11 mol % of allyl group, as determined by proton NMR spectroscopy.

EXAMPLE 4

This example illustrates the preparation of another block copolymer in accordance with an embodiment of the invention, PES-Pm-MDMAE.

20 g of PES-Pg/PolyAGE from Example 1 was dissolved in DMAc (160 mL) at 80° C. After complete dissolution of the polymer, the solution was purged with nitrogen for 5 minutes. 2-(dimethylamino)ethane thiol hydrochloride (15 g) and 2,2'-azobis(2-methylpropionamidine)dihydrochloride (80 mg) were added and the reaction mixture was stirred at 80° C. overnight. The hot reaction mixture was precipitated by drop-wise addition to IPA (550 mL). The resulting precipitate was further stirred in IPA (100 mL) for 2 hours. The precipitate was filtered and washed with deionized water (1000 mL) followed by IPA (500 mL). The resulting product was dried in a vacuum oven at 50° C. overnight yielding 23 g of the desired product, PES-Pm-MDMAE, with 61 mol % of PES, 34 mol % of dimethylamino-ethane thiol group and 5 mol % of remaining allyl glycidyl group, as determined by proton NMR spectroscopy.

EXAMPLE 5

This example illustrates the preparation of another block copolymer in accordance with an embodiment of the invention, PES-Pm-MES.

30 g of PES-Pg/PolyAGE from Example 1 was dissolved in DMAc (150 mL) at 80° C. After complete dissolution of the polymer, the solution was purged for five minutes. Sodium-2-mercaptoethansulfonate (25 g) and 2,2'-azobis(2-methyl-propionamidine)dihydrochloride (500 mg) were added and the reaction mixture was stirred at 80° C. overnight. The hot reaction mixture was precipitated by drop-wise addition to IPA (250 mL). The precipitate was further stirred in IPA for 2 hours, filtered, and dried in a vacuum oven at 50° C. overnight. 34 g of the desired product, PES-Pm-MES, was obtained with 61 mol % of PES, 35 mol % of mercaptoethanesulfonic acid and 4 mol % of allyl group, as determined by proton NMR spectroscopy.

EXAMPLE 6

This example illustrates the preparation of another block copolymer in accordance with an embodiment of the invention, PES-Pm-MPS.

40 g of PES-Pg/PolyAGE from Example 1 was dissolved in DMAc (250 mL) at 80° C. After complete dissolution of the polymer, the solution was purged for five minutes. Mercaptopropane sulfonic acid sodium salt (25 g) and 2,2'-azobis(2-methylpropionamidine)dihydrochloride (500 mg) were added and the reaction mixture was stirred at 80° C. overnight. The hot reaction mixture was precipitated by drop-wise addition to IPA (750 mL). The precipitate was further stirred in IPA for 2 hours, filtered, and dried in a vacuum oven at 50° C. overnight. 48 g of the desired product, PES-Pm-MPS, was obtained with 61 mol % of PES, 36 mol % of mercaptopropanesulfonic acid and 3 mol % of allyl group, as determined by proton NMR spectroscopy.

EXAMPLE 7

This example illustrates the preparation of another block copolymer in accordance with an embodiment of the invention, PES-Pm-MAA.

20 g of PES-Pg/PolyAGE from Example 1 was dissolved in DMAc (100 mL) at 80° C. After complete dissolution of the polymer, the solution was purged for five minutes. Mercaptoacetic acid sodium (15 g) and 2,2'-azobis(2-methylpropionamidine)dihydrochloride (200 mg) were added and the reaction mixture was stirred at 80° C. overnight. The hot reaction mixture was precipitated by drop-wise addition to ethanol (550 mL). The precipitate was further stirred in ethanol for 2 hours, filtered, and dried in a vacuum oven at 50° C. overnight. 22 g of the desired product, PES-Pm-MAA, was obtained with 61 mol % of PES, and 38 mol % of mercaptoacetic acid, as determined by proton NMR spectroscopy. No free allyl group was observed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A block copolymer of the formula: A-B-A (I) or A-B (II), wherein block A is:
   (ii) a copolymer of glycidol and allyl glycidyl ether, wherein one or more of the allyl groups of the copolymer have been replaced with a group of the formula: $-(CH_2)_a-S-(CH_2)_b-X$, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula $-C(H)(COOH)(NH_2)$, and a group of the formula $-C(H)(COOH)(NHAc)$, or a salt thereof; and
   block B is an aromatic hydrophobic polymeric segment.

2. The block copolymer of claim 1, wherein, as X, the acidic group is sulfonic acid or carboxylic acid, the basic group is an amino group, an alkylamino group, or a dialkylamino group, the cation is a quaternary ammonium group, and the zwitterion is a quaternary ammonium alkyl sulfonate group of the formula $-N^+(R^1R^2)(CH_2)_cSO_3^-$, wherein $R^1$ and $R^2$ are alkyl groups and c is 1 to 3.

3. The block copolymer of claim 1, wherein the aromatic hydrophobic polymeric segment is selected from polysulfone, polyethersulfone, polyphenylene ether, polyphenylene oxide, polycarbonate, poly(phthalazinone ether sulfone ketone), polyether ketone, polyether ether ketone, polyether ketone ketone, polyimide, polyetherimide, and polyamide-imide.

4. The block copolymer of claim 3, wherein the aromatic hydrophobic polymeric segment is polyethersulfone.

5. The block copolymer of claim 1, wherein block A is a branched copolymer.

6. The block copolymer of claim 1, which has the following structure:

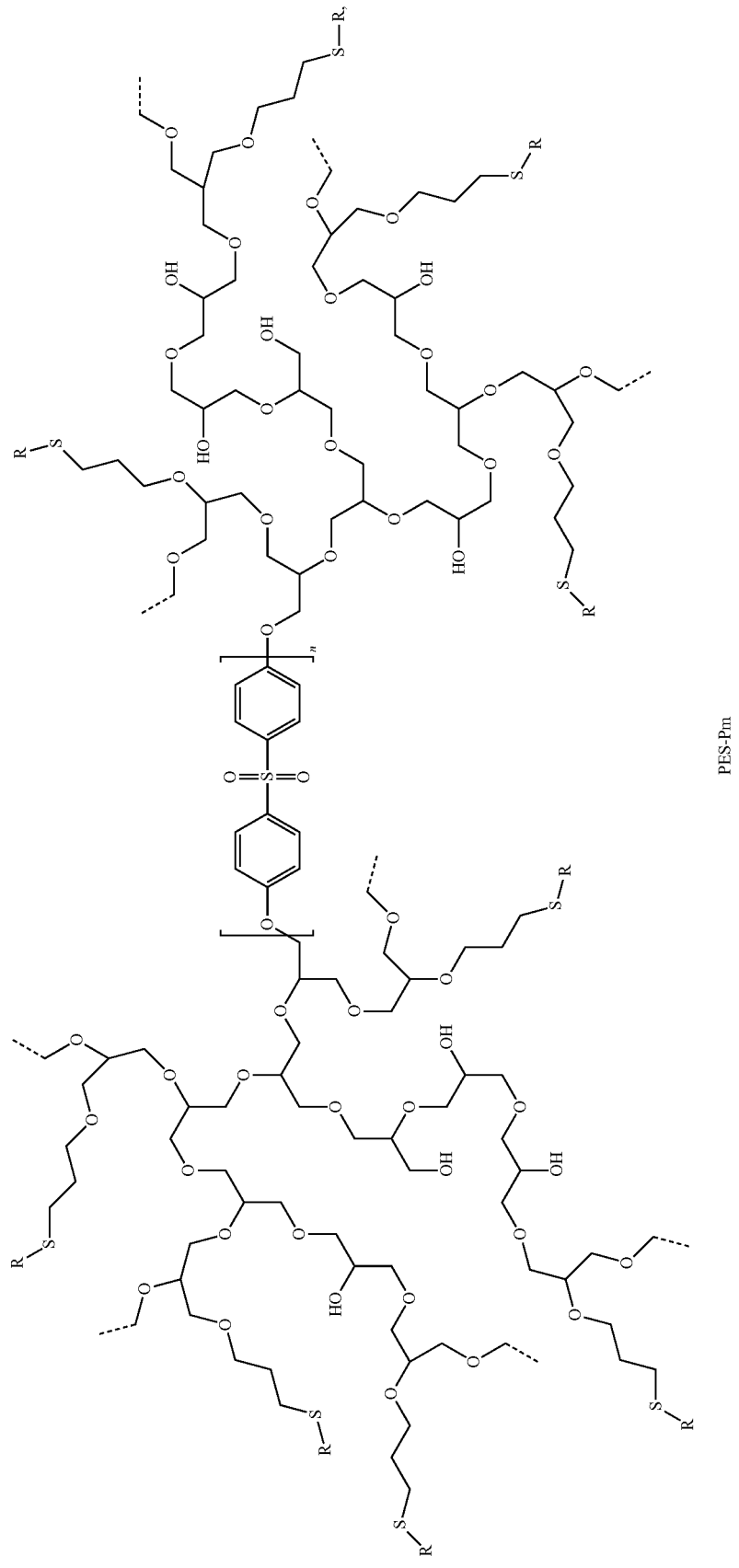

wherein R is allyl or —$(CH_2)_b$—X, wherein b is 1 to 3, and n is about 10 to about 1000.

7. The block copolymer of claim 6, wherein R is —$(CH_2)_b$—X.

8. The block copolymer of claim 6, wherein X is selected from amino, dimethylamino, —$CH_2CH_2SO_3H$, —$CH_2CH_2CH_2SO_3H$, —$CH_2CO_2H$, and —$CH_2CH_2N^+(CH_3)_3$, and combinations thereof.

9. The block copolymer of claim 1, wherein block A is present in an amount of about 20% to about 50 mol % and block B is present in an amount of about 50% to about 80 mol %.

10. The block copolymer of claim 1, which has one of the following structures:

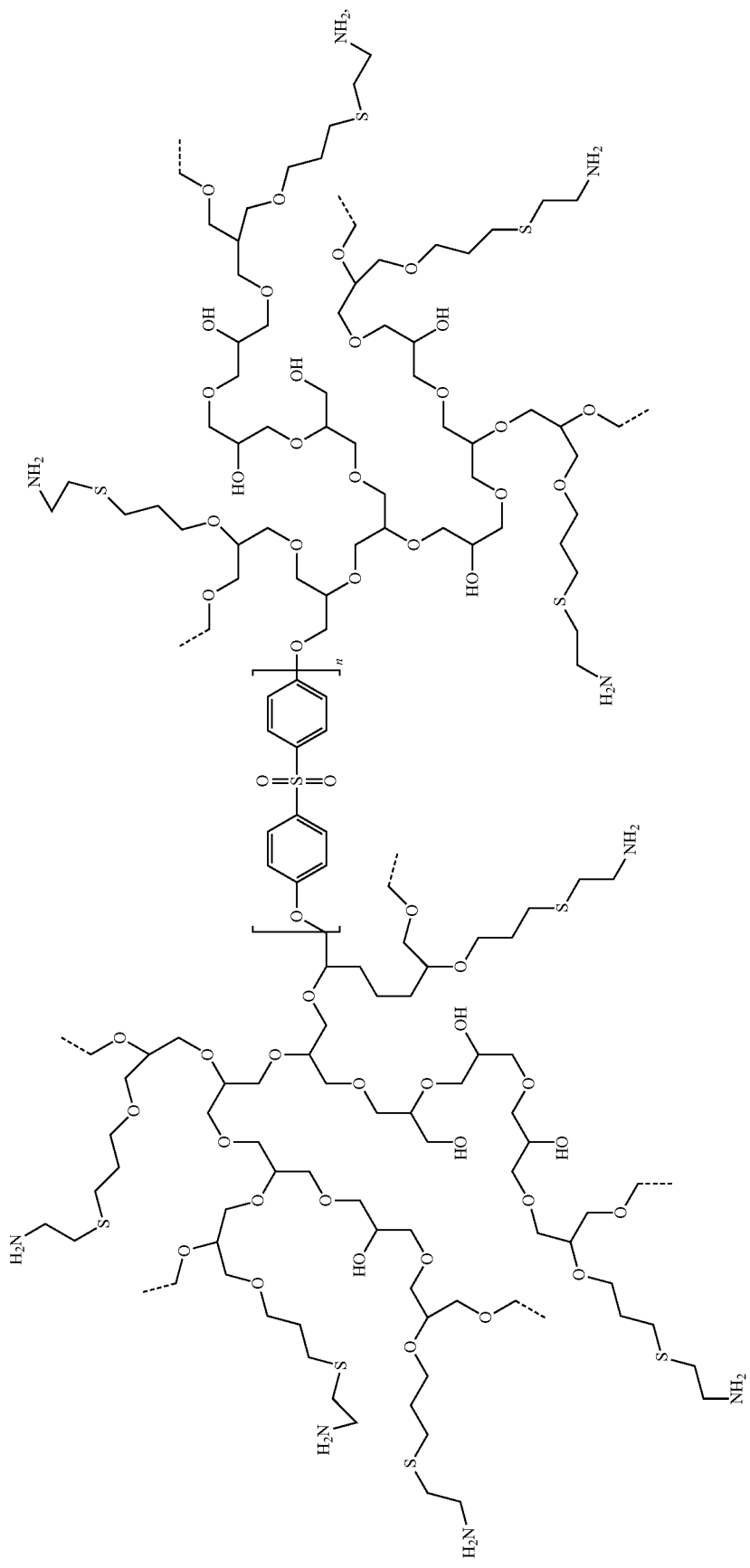
PES-Pm-MEA

-continued
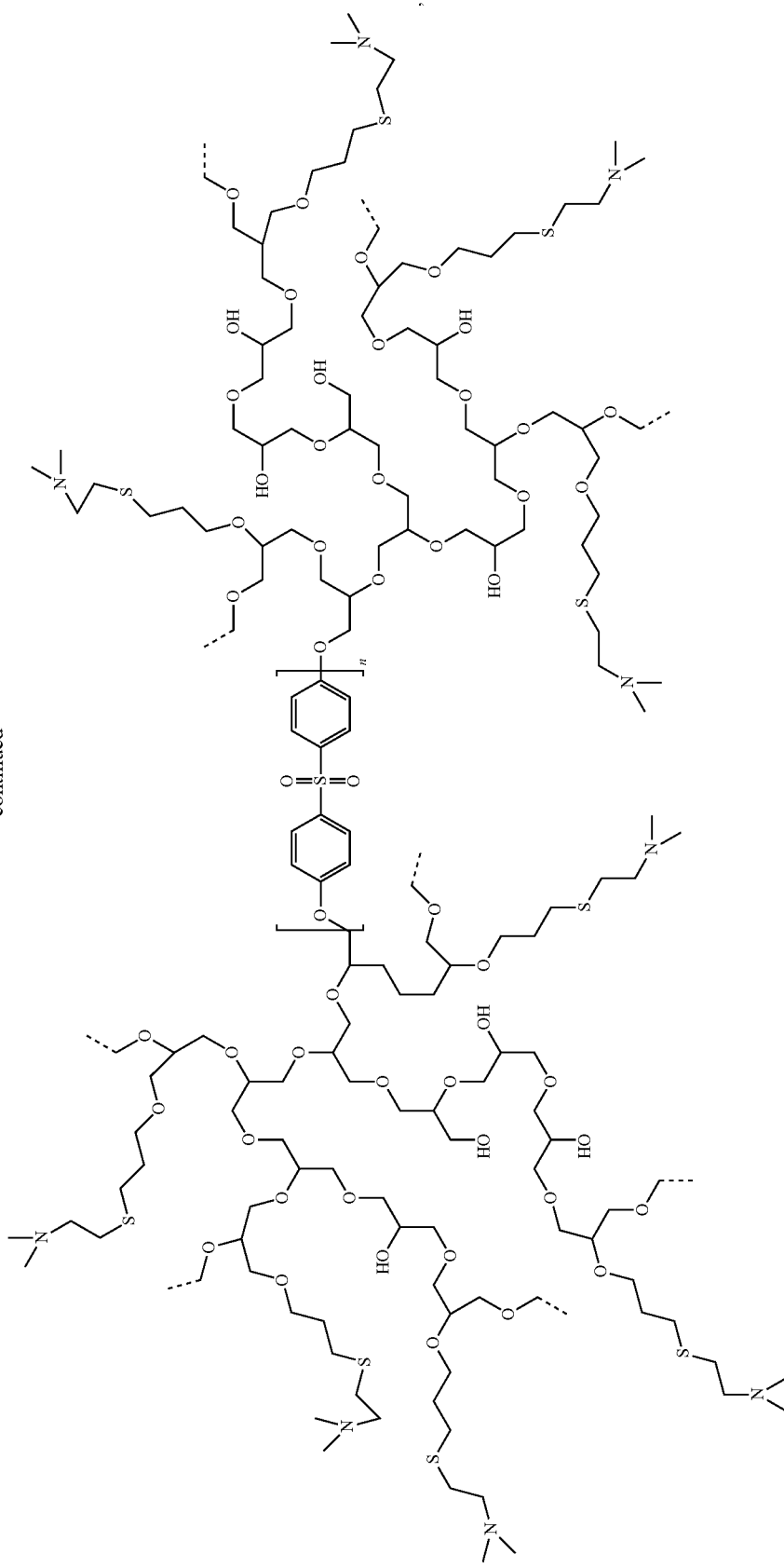
PES-P$_m$-MDAME

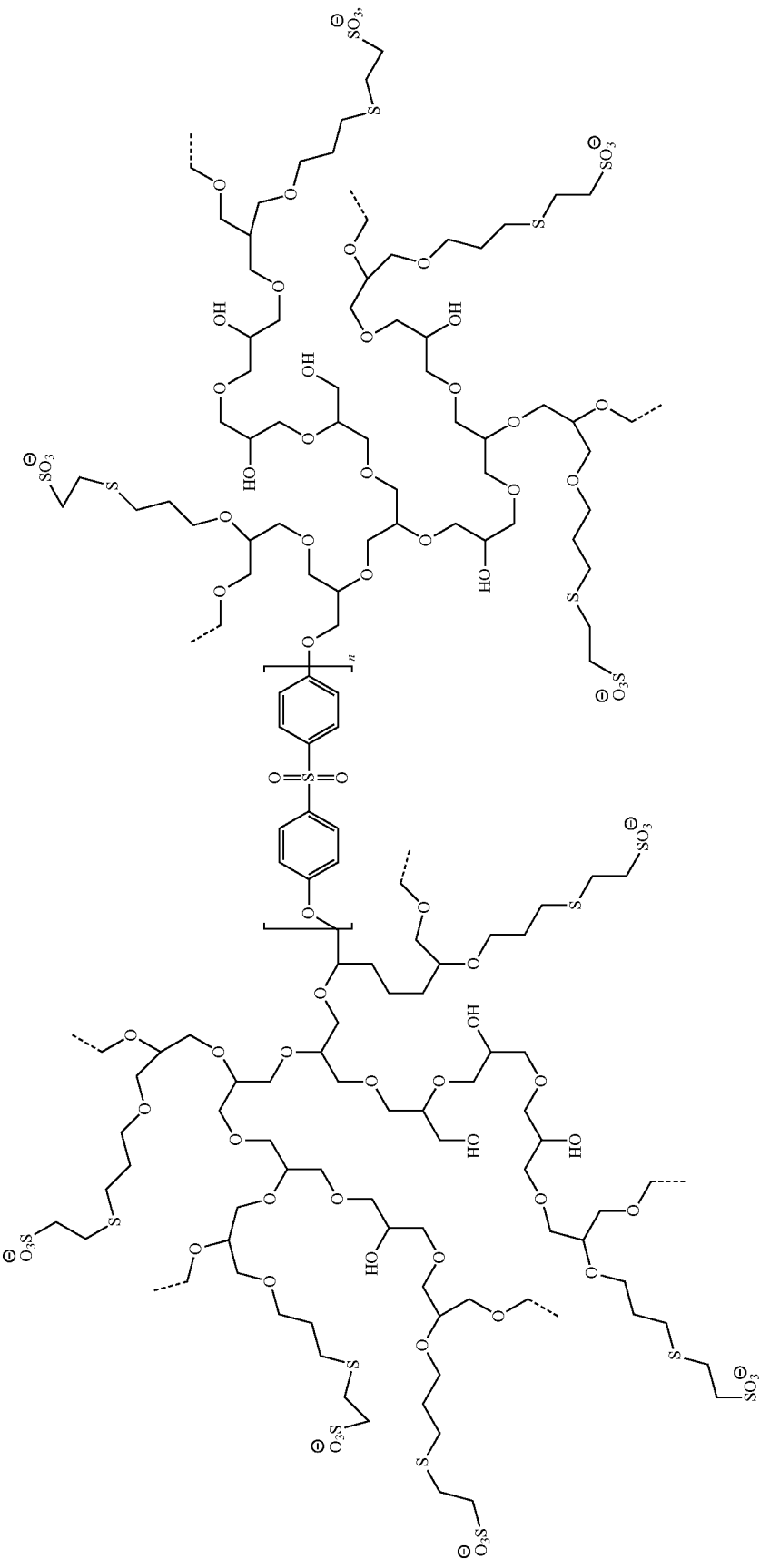
PES-Pm-MES

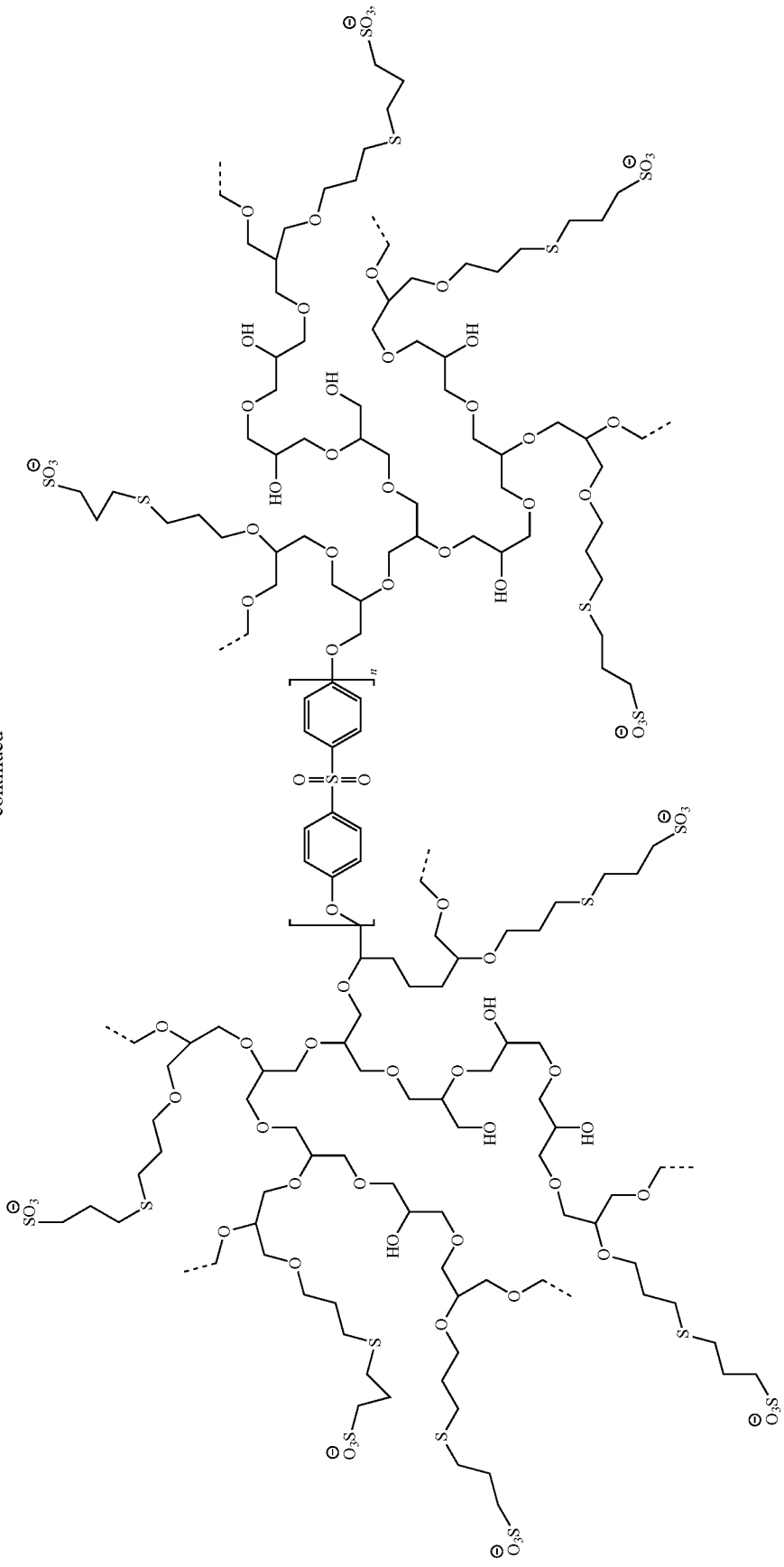

-continued
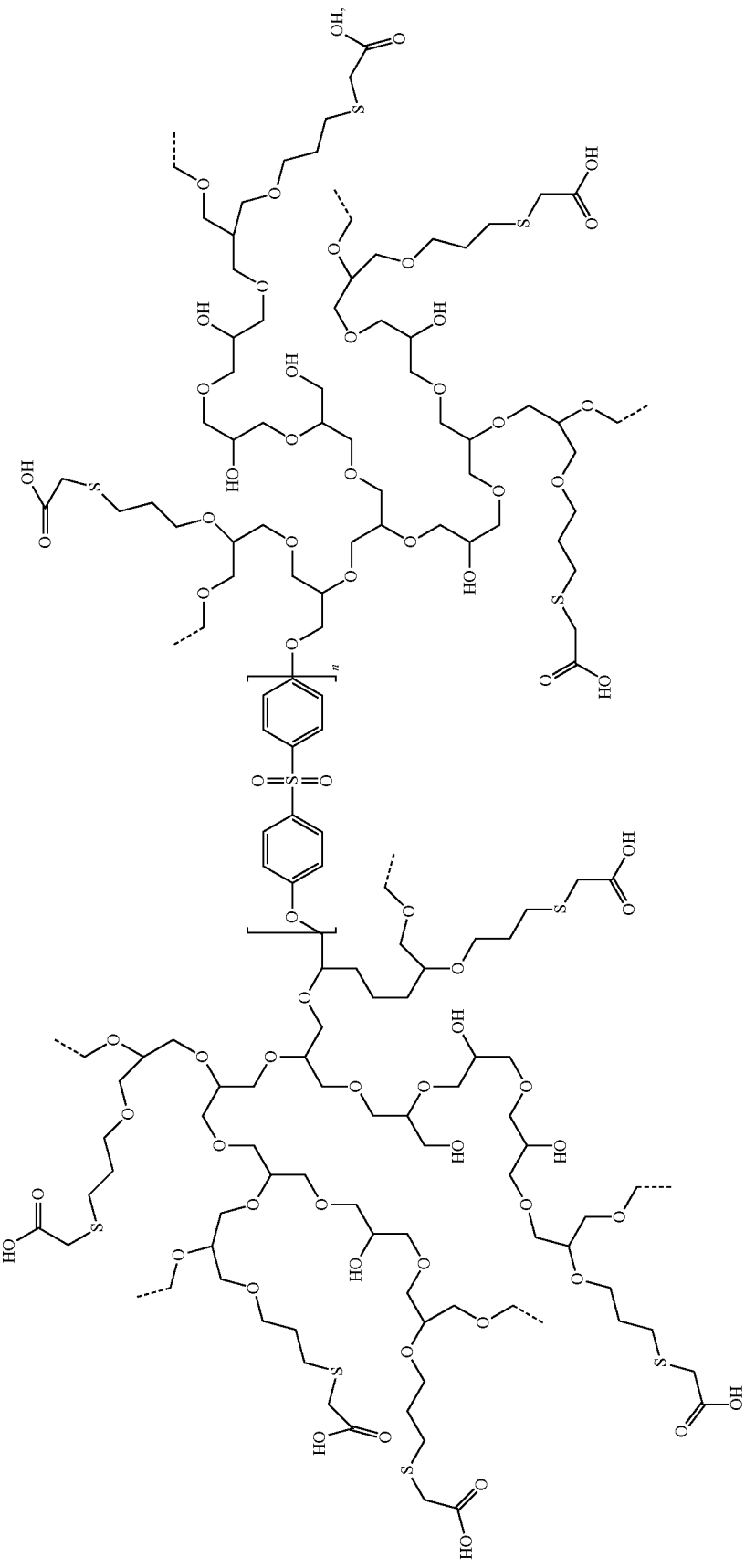
PES-Pm-MDAME wherein n is about 10 to about 1000.

11. A method of preparing a block copolymer of the formula: A-B-A (I) or A-B (II), wherein block A is a copolymer of glycidol and allyl glycidyl ether, wherein one or more of the allyl groups of the copolymer have been replaced with a group of the formula: —$(CH_2)_a$—S—$(CH_2)_b$—X, wherein a is 3 and b is 1 to 3, and X is a group selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)(NH$_2$), and a group of the formula —C(H)(COOH)(NHAc), or a salt thereof; and B is an aromatic hydrophobic polymeric segment;

the method comprising:

(i) providing a block copolymer of the formula: A-B-A (Ia) or A-B (IIa), wherein block A is a copolymer of glycidol and allyl glycidyl ether, the copolymer comprising one or more allyl groups; and block B comprises an aromatic hydrophobic polymeric segment, and (ii) reacting the block copolymer of formula (Ia) or (IIa) with an agent selected from, a carboxyl alkane thiol or a salt thereof, a sulfonic alkane thiol or a salt thereof, a (dialkylamino)alkane thiol or a salt thereof, a haloalkane thiol, hydroxyalkane thiol, an acyl alkane thiol, an alkoxy alkane thiol, an alkylthio alkane thiol, an aldehydo alkane thiol, an amidoalkane thiol, a carbamoyl alkane thiol, an ureido alkane thiol, a cyanoalkane thiol, a nitro alkane thiol, an epoxy alkane thiol, cysteine, an acyl cysteine, an aminoalkane thiol or a salt thereof, an alkylamino alkane thiol, a dialkylaminoalkane thiol, and a sulfonic alkylammonium alkane thiol or a salt thereof.

12. The method of claim 11, wherein the aromatic hydrophobic polymeric segment is selected from polysulfone, polyethersulfone, polyphenylene ether, polyphenylene oxide, polycarbonate, poly(phthalazinone ether sulfone ketone), polyether ketone, polyether ether ketone, polyether ketone ketone, polyimide, polyetherimide, and polyamide-imide.

13. The method of claim 12, wherein the aromatic hydrophobic polymeric segment is polyethersulfone.

14. The method of claim 11, wherein the aromatic hydrophobic polymeric segment B has the formula:

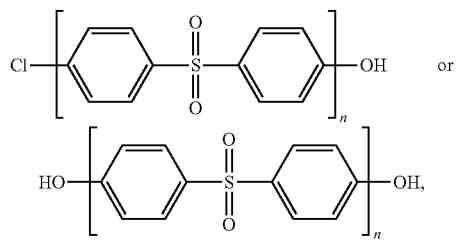

wherein n is about 10 to about 1000.

15. The method of claim 11, wherein the ring opening polymerization is conducted in the presence of a base.

16. The method of claim 15, wherein the base is selected from potassium carbonate, sodium carbonate, cesium carbonate, sodium tertiary butoxide, potassium tertiary butoxide, tetramethylammonium hydroxide, ammonium hydroxide, tetrabutylammonium hydroxide, sodium hydroxide, potassium hydroxide, lithium hydroxide, barium carbonate, barium hydroxide, cesium hydroxide, lithium carbonate, magnesium carbonate, magnesium hydroxide, sodium amide, lithium amide, and combinations thereof.

* * * * *